(12) United States Patent
Kimura et al.

(10) Patent No.: US 7,554,992 B2
(45) Date of Patent: Jun. 30, 2009

(54) MOBILE DEVICE COMMUNICATIONS SYSTEM AND METHOD

(75) Inventors: Masaya Kimura, Yokohama (JP);
Shigeyuki Sato, Yokohama (JP);
Tetsuya Tsukahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 10/751,730

(22) Filed: Jan. 6, 2004

(65) Prior Publication Data

US 2004/0152439 A1 Aug. 5, 2004

Related U.S. Application Data

(63) Continuation of application No. PCT/JP02/07012, filed on Jul. 10, 2002.

(30) Foreign Application Priority Data

Jul. 10, 2001 (WO) .................. PCT/JP01/05977

(51) Int. Cl.
*H04L 12/28* (2006.01)
(52) U.S. Cl. ...................... 370/400; 370/401
(58) Field of Classification Search .............. None
See application file for complete search history.

(56) References Cited

U.S. PATENT DOCUMENTS

| | | | | |
|---|---|---|---|---|
| 5,371,852 A | * | 12/1994 | Attanasio et al. | 709/245 |
| 6,195,680 B1 | * | 2/2001 | Goldszmidt et al. | 709/203 |
| 2001/0055285 A1 | * | 12/2001 | Tomoike | 370/328 |
| 2002/0052798 A1 | * | 5/2002 | Nishikado et al. | 705/26 |
| 2005/0027506 A1 | * | 2/2005 | Kerr et al. | 703/27 |
| 2008/0201488 A1 | * | 8/2008 | Kenner et al. | 709/245 |

FOREIGN PATENT DOCUMENTS

JP 10-084385 3/1998

(Continued)

OTHER PUBLICATIONS

"The Load Distribution Device: Becoming an Essential Product for SI with the Increase of EC Site", *Telecommunication*, RIC Telecom Co. Ltd., vol. 17/No. 7, pp. 92-99, Jun. 25, 2000.

(Continued)

*Primary Examiner*—Hong Cho
*Assistant Examiner*—Anthony Sol
(74) *Attorney, Agent, or Firm*—Staas & Halsey LLP

(57) ABSTRACT

In a communications system connected to a mobile terminal and using a network having a plurality of input/output points at a plurality of service providing servers, it is possible to maintain a TCP connection and a user session by passing a series of communication packets always taking the same route. Load balancers connected to the plurality of input/output points distribute a series of communication packets always in the same packet gateway among a plurality of packet gateways arranged between the load balancers and the service providing servers, and the packet gateway to which a packet is distributed distributes the series of communication packets to a plurality of service providing servers capable of executing an identical service.

9 Claims, 44 Drawing Sheets

FOREIGN PATENT DOCUMENTS

| | | |
|---|---|---|
| JP | 2002-7238 | 1/2002 |
| JP | 2002-140309 | 5/2002 |
| WO | 00/13370 | 3/2000 |
| JP | 11-055327 | 2/1999 |
| JP | 2000-78129 | 3/2000 |
| JP | 2001-69175 | 3/2001 |

OTHER PUBLICATIONS

Yashushi Sakita, "The Basic Elements of EC Sites 7", *Nikkei Communication*, Nikkei Business Publicatins, Inc. No. 345, pp. 194-195, Jul. 2, 2001.

Notice of Rejection Grounds, Issued Jun. 26, 2007 by Japanese Patent Office for Japanese Patent Application No. 2003-512854, 3 pages.

\* cited by examiner

STATUS CHANGE
PACKET TYPE          Status

| TCP/IP HEADER | STATUS CHANGE | Start/Stop/Close/Interim |
|---|---|---|

SESSION START NOTIFICATION
PACKET TYPE

| TCP/IP HEADER | SESSION START NOTIFICATION | MOBILE DEVICE IDENTIFICATION INFORMATION | IP ADDRESS |
|---|---|---|---|

SESSION TERMINATION NOTIFICATION
PACKET TYPE

| TCP/IP HEADER | SESSION TERMINATION NOTIFICATION | IP ADDRESS |
|---|---|---|

SESSION INFORMATION RETRIEVAL
PACKET TYPE

| TCP/IP HEADER | SESSION INFORMATION RETRIEVAL | MOBILE DEVICE IDENTIFICATION INFORMATION |
|---|---|---|

SESSION INFORMATION RETRIEVAL REPLAY
PACKET TYPE                               RETRIEVAL RESULT

| TCP/IP HEADER | SESSION INFORMATION RETRIEVAL REPLAY | MOBILE DEVICE IDENTIFICATION INFORMATION | PRESENCE/ABSENCE | IP ADDRESS |
|---|---|---|---|---|

SESSION INFORMATION ENTRY
PACKET TYPE

| TCP/IP HEADER | SESSION INFORMATION ENTRY | MOBILE DEVICE IDENTIFICATION INFORMATION | IP ADDRESS |
|---|---|---|---|

F I G. 6

| PACKET GATEWAY DEVICE | PACKET ASSIGNMENT RANGE | | NUMBER OF ASSIGNED IP ADDRESSES | OPERATING STATUS OF PACKET GATEWAY DEVICE | USER INFORMATION TABLE ADDRESS |
|---|---|---|---|---|---|
| Pgw1 | 10. 0. 0. 1 | 10. 32. 0. 1 | 20 | OPERATING | * |
| Pgw2 | 10. 32. 0. 1 | 10. 64. 0. 1 | 20 | OPERATING | * |
| Pgw3 | 10. 64. 0. 1 | 10. 96. 0. 1 | 20 | OPERATING | * |
| Pgw4 | 10. 96. 0. 1 | 10. 128. 0. 1 | 19 | OPERATING | * |

FIG. 7

| USER IDENTIFICATION INFORMATION | | | | ASSIGNED IP ADDRESS INFORMATION |
|---|---|---|---|---|
| USER IDENTIFIER | PASSWORD | MOBILE DEVICE IDENTIFICATION INFORMATION | PHONE NUMBER | IP ADDRESS |
| E0658 | E0658aaaa | F50200001 | 9077771111 | 10. 32. 0. 1 |
| E0668 | E0668aaaa | F50200002 | 9077771112 | 10. 32. 0. 2 |
| E0678 | E0678aaaa | F50200003 | 9077771113 | 10. 32. 0. 3 |
| E0688 | E0688aaaa | F50200004 | 9077771114 | 10. 32. 0. 4 |

F I G. 8

| SESSION IDENTIFICATION INFORMATION | MOBILE DEVICE IDENTIFICATION INFORMATION | ASSIGNED IP ADDRESS INFORMATION | SESSION STATE |
|---|---|---|---|
| SESSION IDENTIFICATION | MOBILE DEVICE IDENTIFICATION | IP ADDRESS | |
| 10010001 | F50200001 | 10.32.0.1 | Act |
| 10010002 | F50200002 | 10.32.0.2 | Act |
| 10010003 | F50200003 | 10.32.0.3 | Act |
| 10010004 | F50200004 | 10.32.0.4 | Act |

F I G. 1 0

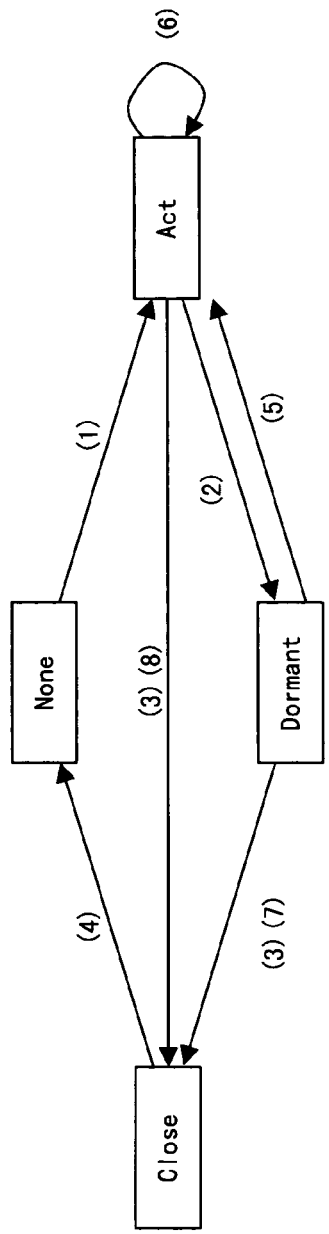

| NUMBER | STATE TRANSITION TRIGGER |
|---|---|
| (1) | SESSION INFORMATION ENTRY FROM USER AUTHENTICATION DEVICE |
| (2) | STATUS CHANGE (STOP) FROM USER AUTHENTICATION DEVICE |
| (3) | STATUS CHANGE (CLOSE) FROM USER AUTHENTICATION DEVICE |
| (4) | SESSION LOG OUTPUT |
| (5) | STATUS CHANGE (START) FROM USER AUTHENTICATION DEVICE |
| (6) | STATUS CHANGE (INTERIM) FROM USER AUTHENTICATION DEVICE |
| (7) | SESSION TIMER TIMEOUT |
| (8) | INTERIM MONITOR TIMER TIMEOUT |

F I G. 1 1

| IP ADDRESS ASSIGNMENT RANGE | | DESTINATION MAC ADDRESS | DESTINATION STATE | SUBSTITUTE DESTINATION MAC ADDRESS 1 | DESTINATION STATE |
|---|---|---|---|---|---|
| 10. 0. 0. 1 | 10. 32. 0. 0 | MAC5 | NORMAL | MAC6 | NORMAL |
| 10. 32. 0. 1 | 10. 64. 0. 0 | MAC6 | NORMAL | MAC5 | NORMAL |
| 10. 64. 0. 1 | 10. 96. 0. 0 | MAC5 | NORMAL | MAC6 | NORMAL |
| 10. 96. 0. 1 | 10. 128. 0. 0 | MAC6 | NORMAL | MAC5 | NORMAL |

| KEY INFORMATION | STORED ADDRESS INFORMATION | | | |
|---|---|---|---|---|
| | SOURCE IP ADDRESS | SOURCE PORT NUMBER | DESTINATION IP ADDRESS | DESTINATION PORT NUMBER |
| 1 | 10. 32. 0. 1 | 8081 | 10. 33. 0. 1 | 8080 |
| 2 | 10. 32. 0. 2 | 8081 | 10. 33. 0. 2 | 8080 |
| 3 | 10. 32. 0. 3 | 8081 | 10. 33. 0. 3 | 8080 |
| 4 | 10. 32. 0. 4 | 8081 | 10. 33. 0. 4 | 8080 |

| SERVICE TYPE | SERVICE REPRESENTATIVE IP ADDRESS | NUMBER OF ACTUAL SERVERS | ACTUAL SERVER 1 IP ADDRESS | SERVER STATE | ACTUAL SERVER 2 IP ADDRESS | SERVER STATE |
|---|---|---|---|---|---|---|
| WAP | 10. 33. 0. 1 | 2 | 10. 33. 1. 10 | NORMAL | 10. 33. 1. 11 | NORMAL |
| MAIL | 10. 33. 0. 2 | 2 | 10. 33. 1. 20 | NORMAL | 10. 33. 1. 21 | NORMAL |
| CHAT | 10. 33. 0. 3 | 2 | 10. 33. 1. 30 | NORMAL | 10. 33. 1. 31 | NORMAL |
| EXTERNAL CONNECTION | 10. 33. 0. 4 | 2 | 10. 33. 1. 40 | NORMAL | 10. 33. 1. 41 | NORMAL |

| MOBILE DEVICE IDENTIFICATION INFORMATION | SERVICE ORDER INFORMATION | | | |
|---|---|---|---|---|
| | WAP | MAIL | CHAT | EXTERNAL CONNECTION |
| F50200001 | OK | OK | OK | NG |
| F50200002 | OK | OK | OK | NG |
| F50200003 | OK | OK | OK | NG |
| F50200004 | OK | OK | OK | OK |

| SERVICE PROVIDING SERVER INFORMATION ||
|---|---|
| SERVICE TYPE | SERVICE REPRESENTATIVE IP ADDRESS |
| WAP | 10. 33. 0. 1 |
| MAIL | 10. 33. 0. 2 |
| CHAT | 10. 33. 0. 3 |
| EXTERNAL CONNECTION | 10. 33. 0. 4 |

FIG. 27

| MOBILE DEVICE IDENTIFICATION INFORMATION | SERVICE PROVIDING SERVER INFORMATION | | ACCOUNTING ATTRIBUTE INFORMATION | | ACCOUNTING INFORMATION | |
|---|---|---|---|---|---|---|
| | SERVICE TYPE | SERVICE REPRESENTATIVE IP ADDRESS | PROXY ACCOUNTING | CONNECTION SERVER | NUMBER OF PACKETS | TOTAL PACKET LENGTH |
| F50200001 | WAP | 10.33.0.1 | — | — | 5 | 500 |
| F50200002 | MAIL | 10.33.0.2 | — | — | 6 | 600 |
| F50200003 | CHAT | 10.33.0.3 | — | — | 7 | 700 |
| F50200004 | EXTERNAL CONNECTION | 10.33.0.4 | YES | www.Hoo.com | 3 | 300 |

| USER SESSION IDENTIFIER | PROTOCOL IDENTIFICATION | STORED ADDRESS INFORMATION ||||| 
|---|---|---|---|---|---|
| | | SOURCE IP ADDRESS | SOURCE PORT NUMBER | SOURCE IP ADDRESS | SOURCE PORT NUMBER | ACTUAL SERVER IP ADDRESS |
| 81 | TCP | 10.32.0.1 | 81 | 10.33.0.1 | 80 | 10.33.1.10 |
| 81 | TCP | 10.32.0.1 | 81 | 10.33.0.2 | 80 | 10.33.1.20 |
| 82 | TCP | 10.32.0.2 | 82 | 10.33.0.2 | 80 | 10.33.1.20 |
| 83 | TCP | 10.32.0.3 | 83 | 10.33.0.3 | 80 | 10.33.1.30 |
| 84 | TCP | 10.32.0.4 | 84 | 10.33.0.4 | 80 | 10.33.1.40 |

| USER SESSION TYPE | WHEN RECORD OF ADDRESS INFORMATION STORAGE TABLE IS GENERATED | WHEN DESTINATION ADDRESS INFORMATION ABOUT RECORD OF ADDRESS INFORMATION STORAGE TABLE IS SET | WHEN DESTINATION ADDRESS INFORMATION ABOUT RECORD OF ADDRESS INFORMATION STORAGE TABLE IS CLEARED | WHEN RECORD OF ADDRESS INFORMATION STORAGE TABLE IS DELETED |
|---|---|---|---|---|
| LOG-IN UNIT | WHEN "SESSION START" IS RECEIVED FROM USER AUTHENTICATION DEVICE | (1) WHEN DESTINATION ADDRESS INFORMATION IS NOT SET WHEN UP PACKET IS RECEIVED FROM MOBILE DEVICE (2) DESTINATION ADDRESS INFORMATION IS DIFFERENT FROM RECEIVED PACKET (ADDING RECORD) | | WHEN "SESSION TERMINATION" IS RECEIVED FROM USER AUTHENTICATION DEVICE |
| SERVICE UNIT | WHEN "SESSION START" IS RECEIVED FROM USER AUTHENTICATION DEVICE | (1) WHEN DESTINATION ADDRESS INFORMATION IS NOT SET WHEN UP PACKET IS RECEIVED FROM MOBILE DEVICE (2) DESTINATION ADDRESS INFORMATION IS DIFFERENT FROM RECEIVED PACKET | | WHEN "SESSION TERMINATION" IS RECEIVED FROM USER AUTHENTICATION DEVICE |
| PACKET UNIT (UDP) | WHEN "SESSION START" IS RECEIVED FROM USER AUTHENTICATION DEVICE | WHEN UP PACKET IS RECEIVED FROM MOBILE DEVICE | WHEN DOWN PACKET IS TRANSMITTED TO MOBILE DEVICE | WHEN "SESSION TERMINATION" IS RECEIVED FROM USER AUTHENTICATION DEVICE |
| CONNECTION UNIT (TCP) | WHEN "SESSION START" IS RECEIVED FROM USER AUTHENTICATION DEVICE | WHEN CONNECTION ESTABLISHMENT REQUEST (TCP SYN PACKET) IS RECEIVED FROM MOBILE DEVICE | WHEN DISCONNECTION REPLY (FIN ACT PACKET) IS TRANSMITTED TO MOBILE DEVICE | WHEN "SESSION TERMINATION" IS RECEIVED FROM USER AUTHENTICATION DEVICE |

F I G. 3 3

| PROTOCOL TYPE | SERVICE REPRESENTATIVE IP ADDRESS | DESTINATION PORT NUMBER | USER SESSION TYPE |
|---|---|---|---|
| TCP | 10. 33. 0. 1 | 80 | SERVICE UNIT |
| TCP | 10. 33. 0. 2 | 80 | PACKET UNIT |
| TCP | 10. 33. 0. 3 | 80 | CONNECTION UNIT |
| TCP | 10. 33. 0. 4 | 80 | LOG-IN UNIT |

F I G. 3 5

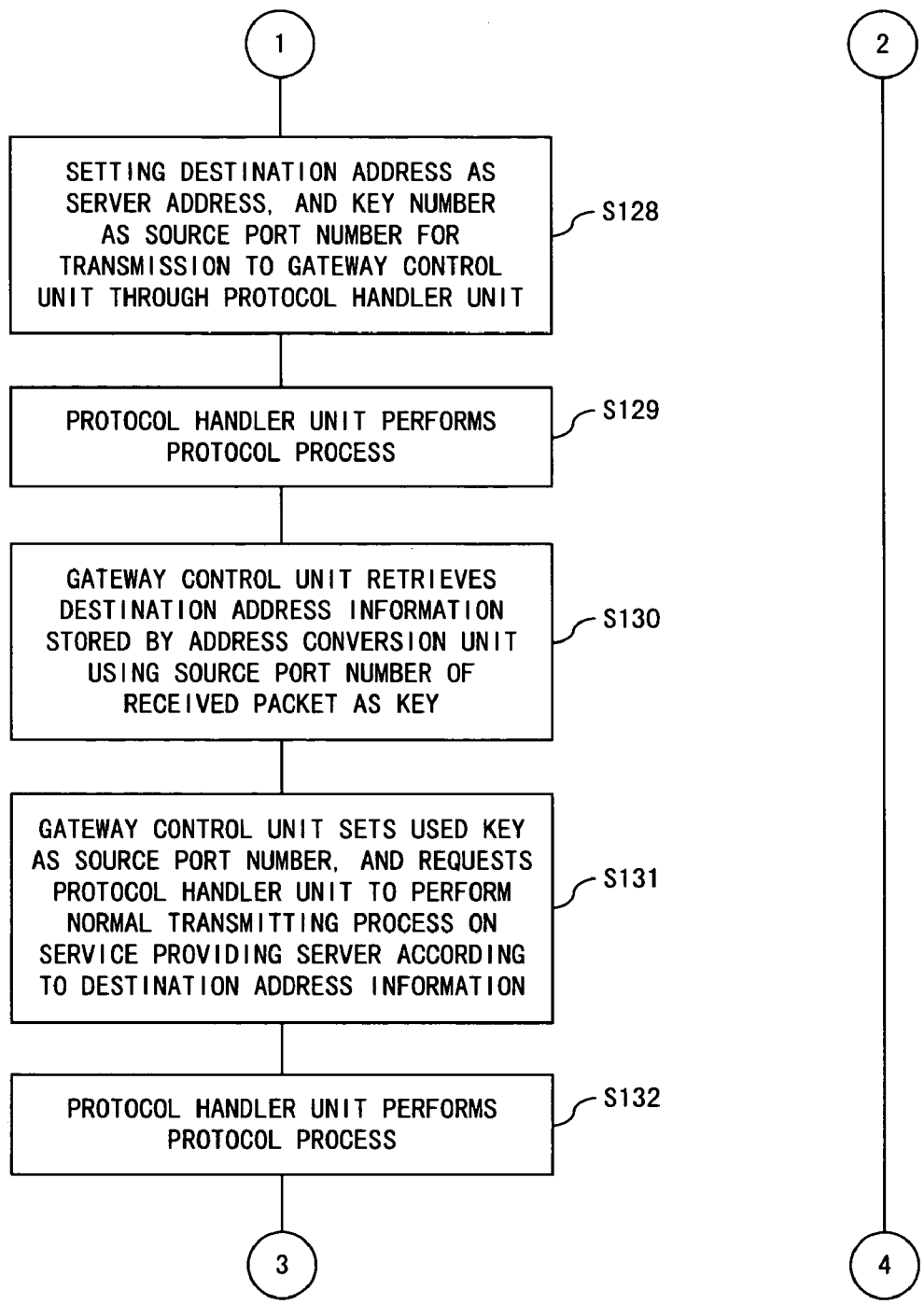
F I G. 3 7

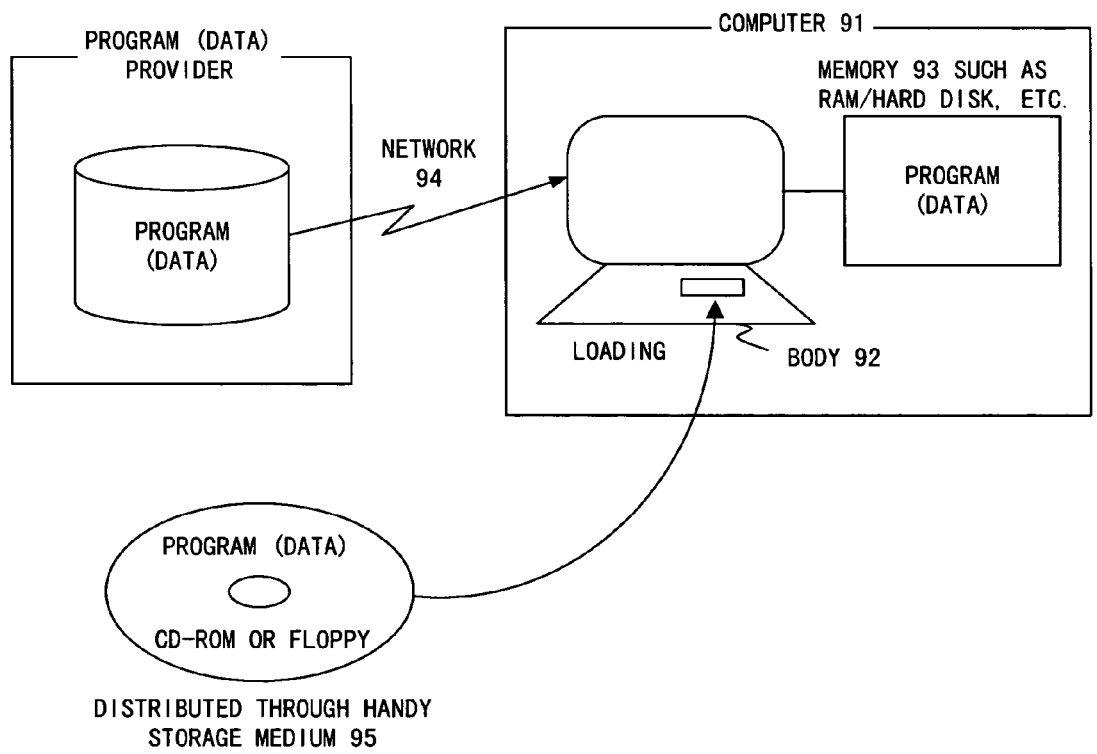
F I G. 44

MOBILE DEVICE COMMUNICATIONS SYSTEM AND METHOD

CROSS REFERENCE TO RELATED APPLICATION

This application is a continuing application, filed under 35 U.S.C. § 111(a), of International Application PCT/JP02/07012, filed Jul. 10, 2002, with foreign priority benefit based upon International Application PCT/JP01/05977, filed Jul. 10, 2001.

BACKGROUND OF THE INVENTION

1. Field of the Invention

The present invention relates to a communications system and a communications method using a network, and more specifically to a mobile device communications system and method which are provided with a plurality of service providing servers and perform communications using a mobile terminal.

2. Description of the Prior Art

FIG. 42 is a block diagram of the system configuration of the first conventional technology of the mobile device communications system, for example, a mobile device packet network. In FIG. 42, the user of the system, that is, a client, performs communications between mobile devices or with a plurality of service providing servers using mobile devices (MS) 100a, 100b, . . . , for example, a mobile phone.

In FIG. 42, a mobile device packet network includes, for example, a mobile IP (Internet protocol) 101, a network access device (NAS) for performing a process corresponding to the access gained by each of mobile devices (MS) 100a, 100b, . . . to the mobile IP network 101, or foreign agents (FA) 102a, 102b, . . . , routers (R) 103a, 103b, and 103c connected to the input/output point of the service providing server of the network 101, a user authentication device 104 connected to the routers, load balancers 105a, 105b, and 105c connected to each router, a local area network or wide area network (LAN/WAN) 106 for connection of these load balancers with a plurality of service providing servers, and a home agent (HA) 107 on a mobile IP network.

A plurality of service providing servers form a group configured by a plurality of servers for providing the same services. For example, service providing servers 110a, 110b, 110c, . . . are configured by servers capable of providing the same servers as a group. Therefore, for example, servers of a group configured by service providing servers 111a, 111b, 111c, . . . and servers of a group configured by service providing servers 112a, 112b, 112c, . . . provide different services.

In the mobile device packet network shown in FIG. 42, communications are performed between the mobile devices, for example, a mobile phone and a service providing server. Since a server capable of providing a service requested by a client forms a group as described above, a load balancer for processing an input packet from a client is provided at a stage before the service providing server such that input packets can be distributed to the service providing servers in accordance with the balancing policy by which the loads of the servers can be balanced.

In the common load balancing system, a grouped service providing server is assigned representative address information, a client transmits a packet using the representative address information as a destination, and the packet is distributed to any service providing server in the group based on the balancing policy of the load balancer.

The balancing policy can be a round robin policy, a weighted round robin policy, a priority policy, a minimum number of connections policy, a fastest response time policy, a CPU load policy, etc. A balancing policy information table indicating the above-mentioned balancing policies is provided for the load balancer.

For example, in a mobile device packet network operated by a common carrier for providing a communications service, there are a large number of users, and a plurality of routers (R) 103a, 103b, and 103c and load balancers 105a, 105b, and 105c are provided at the input/output point of the service providing servers of the mobile IP network 101 shown in FIG. 42 to distribute the users, thereby performing load balancing for a number of service providing servers.

However, with the above-mentioned configuration, when a mobile device, for example, the mobile device 100a moves during the communications, the input/output point of the service providing server to the mobile IP network 101 dynamically changes. For example, although communications are first performed through the router 103a and the load balancer 105a, the communications can be next performed through the router 103c and the load balancer 105c. In such a case, for example, when the three load balancers 105a, 105b, and 105c perform load balancing based on the respective balancing policies, a packet can be distributed to different service providing servers in the same group. In this case, there can be the problem that a TCP (transmission control protocol) connection, that is, a connection for reception of a specific service, cannot be maintained.

Furthermore, in the above-mentioned case, for example, although the load balancers 105a and 105c distribute packets to the same service providing server in the group, the packets do not pass through the same path between the mobile IP network 101 and the service providing servers if, for example, the mobile device 100a transmits an up packet, that is, a packet to a service providing server, moves during reception of a down packet, that is, a packet from a service providing server, and the up packet after the movement passes through the load balancer.

Thus, the conventional technology using a layer 7 switch for maintenance of a user session has been suggested to distribute a packet to the same service providing server although the input/output point of a service providing server to a network dynamically changes with the movement of a mobile device during communications. A user session is defined by, for example, a UDP (user datagram protocol).

Unlike the TCP, a UDP is a connectionless protocol. Although there is no concept of a connection for the protocol, there is a concept of a session under an upper protocol of a UDP, for example, a domain name system (DNS) as a mechanism of solving a standard name for use in Internet. In this concept, a process can be completed by the same server processing a series of UDP packets. The communications using a plurality of UDP packets for completion of the process is referred to as a user session under the UDP.

A user session is defined for a TCP as well as a UDP. Under the TCP, there is a concept of a user session under an upper protocol, for example, a hyper text transfer protocol (HTTP). In this concept, a process can be complete by performing the establishment of a series of TCP connections, the transfer of data, and the release. The communications in a series of TCP connections performed to complete the process are called a user session under the TCP.

There also occurs the problem with the user session under the UDP and TCP that a packet cannot be distributed to the same service providing server due to a dynamic change of the input/output point to the network by the movement of a mobile device during the communications, and the user session cannot be successfully maintained. The conventional technology to maintain a user session is described below by referring to FIG. 43.

FIG. 43 shows a conventional technology of a mobile device communications system using a layer 7 switch. In the conventional technology, a plurality of transparent proxy (T.P.) devices 120a, 120b, and 120c, a plurality of layer 7 switch (L7SW) devices 121a, 121b, and 121c, and a network 122 between the plurality of load balancers and service providing servers shown in FIG. 42, and a layer 7 switch performs static load balancing using the user identification information under the layer 7 protocol such as an HTTP, etc. as a key by the layer 7 switch, thereby enabling communications to be distributed to the same service providing server while continuing the user session under the TCP and UDP.

As described above, the following five problems occur because packets are not transmitted through the same path between the mobile IP network 101 and the service providing server as shown in FIG. 42 as described above.

The first problem is that is requires a long time to switch services. The management of a TCP connection and a user session corresponding to one service is to be performed on the service providing server side, and a TCP connection is to be reconnected each time a service is switched, thereby requiring a reconnection of a TCP connection each time a service is switched as viewed from the mobile device side, and requiring a long time to switch the service.

The second problem is that it can not balancing a risk when a service providing server goes down. If a service providing server which manages a TCP connection and a user session goes down, the connection cannot be switched to the server for providing the same services, and services cannot be provided until the faulty service providing server recovers from the fault.

The third problem is that proxy accounting information can not be generated. That is, only the service providing server which manages the TCP connection or the user session can perform an authenticating process in a contract service unit in providing a service for a client, and no proxy generation of accounting information can be performed for pay contents.

The fourth problem is that protocol conversion of a transport layer can not be performed between a wireless network and a cable network. There is a difference in delay time, etc. between a wireless network and a cable network. Therefore, to set a standard Internet service in the optimum format in the wireless communications, it is necessary to convert a window size (the amount of data which can be transmitted at a time, etc.), that is, a protocol conversion of a transport layer between the wireless network and the cable network. If packets are not transmitted through the same path, a trunk device for protocol-converting a transport layer cannot be provided.

The fifth problem is that no gateway function between the network of the Internet protocol version (IPV) 4 and the network of the IPV6 network can be provided. Recently, with an increasing number of mobile phones, large expansion of IP addresses is required, and there are plans to implement IPV6. When IPV6 is implemented, a gateway function will be required between the current IPV4 network and the IPV6 network. However, when packets are not transmitted through the same path, the gateway function cannot be provided.

As described above by referring to FIG. 43, the following problem occurs when a user session is maintained using the layer 7 switch.

The first problem is that loads can be concentrated on a specific service providing server because packets corresponding to the request from the client having the same user identification information are distributed to the same service providing server.

The second problem is that the processes of adding a layer 7 switch each time a service is added, that is, analyzing an additional service (layer 7 protocol), identifying a session, etc., thereby failing in quickly adding services. Especially, a common carrier frequently has to add services, and the problem is serious.

The third problem is that the performance of the packet distributing process is low. Since the process by the layer 7 switch is normally implemented by software, the problem is that the performance of the packet distributing process is lower than that by the hardware (firmware).

The present invention has been developed to solve the above-mentioned problems, and aims at setting the same path for packets which configure the same TCP connection and user session although a plurality of input/output points are provided on the service providing server side of an IP network and a load balancer is provided for each input/output point, and maintaining a TCP connection although a mobile device performs communications while it moves. Another object of the present invention is to provide a gateway function in the path to avoid the necessity for making time for switching services, balance a risk when the service providing server goes down, perform proxy generation of accounting information, and perform a transport layer protocol conversion, and further realize a gateway function between the IPV4 network and the IPV6 network.

SUMMARY OF THE INVENTION

FIG. 1 is a block diagram of the configuration showing the principle of the mobile device communications system according to the present invention. FIG. 1 is a block diagram of the configuration showing the principle of the communications system which is provided with service providing servers 7a, 7b, . . . , 8a, 8b, . . . and allows mobile terminals 1a, . . . , 1n to establish communications.

In FIG. 1, the mobile terminals 1a, . . . , 1n are connected to a first network unit 2 having a plurality of input/output points to a service providing server, and can be, for example, a mobile IP network.

A plurality of first communication distribution units 3a, 3b, . . . are, for example, a load balancer, and is connected to each of the plurality of input/output points of the first network unit 2.

A second network unit 4 is a network to which the first communication distribution units 3a, 3b, . . . are connected, and can be, for example, a local area network or a wide area network.

A third network unit 5 is a network to which the plurality of service providing servers 7a, 7b, . . . , 8a, 8b, . . . are connected, and can be, for example, a local area network or a wide area network.

A plurality of second communications distribution units 6a, 6b, . . . are connected between the second network unit 4 and the third network unit 5, distributes a series communications between a mobile terminal and a service providing server to any of a service providing servers, and can be, for example, a packet gateway device.

Then, the first communication distribution units 3a, 3b, . . . are configured to distribute a series of communications between a mobile terminal and a service providing server to any of a plurality of second communications distribution units 6 through the second network unit 4.

An embodiment of the present invention further includes a session management device for assigning an identifier to a session which is a series of communications between a mobile terminal and a service providing server, and managing the identifier. Each of the first communication distribution units 3a, 3b, . . . further includes a same storage contents destination storage unit for storing any of the second communications distribution units 6a, 6b, . . . for distributing a series of communications corresponding to the identifier of a session as the series of communications between a mobile terminal and a service providing server.

In this case, the second communications distribution unit can assign an identifier to a user session as a series of communications in a layer higher than a layer corresponding to the session managed by the session management device, and can distribute the communications in the user session between the mobile terminal and the service providing server to any of the plurality of service providing server corresponding to the identifier. Furthermore, there are a plurality of user session types, and the second communications distribution unit can distribute the communications in the user session corresponding to the type of the user session.

According to an embodiment of the present invention, a plurality of service providing servers configure a plurality of groups each being configured by servers which provide the same services, the mobile terminal specifies a representative address for each of the plurality of groups, and establishes communications to and from a service providing server, and the second communications distribution units 6a, 6b, . . . can distribute a series of communications to any of the service providing servers in the group specified by the representative address. In this case, when the mobile terminal changes the representative address to switch a service to be received in a series of communications, the second communications distribution units 6a, 6b, . . . can distribute the subsequent communications in the series of communications to any of the service providing servers in the group specified by the representative address after the change, and continue the series of communications.

Furthermore, according to an embodiment of the present invention, when the second communications distribution units 6a, 6b, . . . distribute a series of communications to any of the plurality of service providing servers, a user of a mobile terminal can further include service authentication units for authenticating the qualification of a user of a mobile terminal for a service provided by the service providing server.

Furthermore, according to an embodiment of the present invention, the second communications distribution units 6a, 6b, . . . can also distribute a series of communications not only to a plurality of service providing servers, but also to a server outside the mobile device communications system. The mobile terminal can further include an accounting information generation unit for generating accounting information for a service received from a service providing server or a server outside the mobile device communications system.

In a mobile device communications method according to the present invention, a mobile terminal can transmit a packet in a series of communications by specifying any of a plurality of service providing servers, a load balancer which receives the packet can distribute the packet to any of the plurality of packet gateway devices corresponding to an identifier for the series of communications, and the packet gateway device to which the packet is distributed can distribute the packet to any of the plurality of service providing servers which provide the same services as the service providing server specified by the mobile terminal. The load balancer corresponds to the first communications distribution unit, and the packet gateway device corresponds to the second communications distribution unit.

In this method, a packet (down packet) in a series of communications from the service providing server to the mobile terminal is transmitted first from the service providing server to the packet gateway device which has distributed a packet (up packet) from the mobile terminal to the service providing server, transmitted from the packet gateway device to the load balancer which has distributed the up packet, and finally transmitted to the mobile terminal.

In addition, the present invention includes a portable computer-readable storage medium which is used by a computer forming the packet gateway device and stores a program used to direct the computer to perform the steps of: storing a destination address and a source address of a packet received from the load balancer using a unique source port number as a key; setting the unique source port number as a source port number of a packet header; selecting a plurality of service providing servers capable of providing a service requested by a mobile terminal from among a plurality of service providing servers so that the selected service providing server can share the load; and setting the addresses of the selected service providing servers as destination addresses and the address of the apparatus as a source address, and transmitting a packet to the service providing server. When the mobile terminal moves and the corresponding network access device is switched, the mobile terminal has the link of the PPP (point-to-point protocol) temporarily suspended. However, the PPP protocol stack does not notify the TCP protocol stack of the suspension, thereby preventing the TCP connection from being disconnected.

In this case, an identifier for a user session as a series of communications in a layer higher than the layer corresponding to the session as a series of the communications between the mobile terminal and the service providing server in the hierarchical structure of the communications can also be used as the above-mentioned unique source port number.

Also used as a storage medium by the computer forming the packet gateway device is a portable computer-readable storage medium storing a program used to direct a computer to perform the steps of: retrieving mobile device identification information about the mobile terminal as a source of the packet received from the load balancer; retrieving the destination address of the received packet; and determining whether or not the service provided by the service providing server of the destination address can be provided for the user of the mobile terminal according to the mobile device identification information and the destination address.

Furthermore, used as a storage medium by a computer forming the packet gateway device, there is a portable computer-readable storage medium storing a program used to direct the computer to perform the steps of: retrieving the destination address and the source address of a packet received from a load balancer, and setting them in an accounting record when a series of communications between a mobile terminal and a service providing server start; incrementing the number of packets of an accounting record each time a packet is received from the load balancer until the series of communications terminate; retrieving a packet length from the received packet, and adding the packet length to the packet length of the accounting record; and changing the source address in the accounting record into the identification information about the user of the mobile terminal, and the destination address into the information about the service providing server when a series of communications terminate.

Used by a computer forming the packet gateway device is a program used to direct the computer to perform the procedures of: storing the destination address and the source address of the packet received from a load balancer using a unique source port number as a key; selecting means for setting the unique source port number as a source port number of a packet header, and a plurality of service providing servers capable of providing a service requested by a mobile terminal from among a plurality of service providing servers so that the loads of the service providing servers can be balanced; and setting the address of the selected service providing server as a destination address, and the address of the apparatus as a source address, and transmitting the packet to the service providing server.

In this case, an identifier for a user session as a series of communications in a layer higher than the layer corresponding to the session as a series of the communications between the mobile terminal and the service providing server in the hierarchical structure of the communications can also be used as the above-mentioned unique source port number.

Used as a program by the computer forming the gateway device is a program used to direct a computer to perform the procedures of: retrieving mobile device identification information about the mobile terminal as a source of the packet received from the load balancer; retrieving the destination address of the received packet; and determining whether or not the service provided by the service providing server of the destination address can be provided for the user of the mobile terminal according to the mobile device identification information and the destination address.

Furthermore, used by a computer forming the packet gateway device, there is a program used to direct the computer to perform the procedures of: retrieving the destination address and the source address of a packet received from a load balancer, and setting them in an accounting record when a series of communications between a mobile terminal and a service providing server start; incrementing the number of packets of an accounting record each time a packet is received from the load balancer until the series of communications terminate; retrieving a packet length from the received packet, and adding the packet length to the packet length of the accounting record; and changing the source address in the accounting record into the identification information about the user of the mobile terminal, and the destination address into the information about the service providing server when a series of communications terminate.

As described above, according to the present invention, a plurality of packet gateway devices are provided between the load balancer and a service providing servers provided at a plurality of input/output points of the network to which a mobile device is connected, and a series of communications of packets between one of a mobile device and service providing servers can be performed constantly through the same packet gateway device.

BRIEF DESCRIPTION OF THE DRAWINGS

FIG. 6 shows a packet format according to an embodiment of the present invention;

FIG. 7 shows an example of the data of the address information table in the user authentication device;

FIG. 8 shows an example of the data of the user information table in the user authentication device;

FIG. 10 shows an example of the data of the session information table;

FIG. 11 shows the state transition of a session state;

FIG. 14 shows an example of the data of the balancing policy information table in the load balancer;

FIG. 22 shows an example of the data of the address information storage table in the packet gateway device;

FIG. 23 shows an example of the data of the balancing policy information table in the packet gateway device;

FIG. 26 shows an example of the data of the service order information table in the packet gateway device;

FIG. 27 shows an example of the data of the service providing server information table in the packet gateway device;

FIG. 29 shows an example of the data of the accounting record generated by the packet gateway device;

FIG. 32 shows an example of the storage contents of the address information storage table according to the second embodiment of the present invention;

FIG. 33 shows the timing of generating and deleting a record of the address information storage table;

FIG. 35 shows an example of the storage contents of the user session type identification information table;

FIG. 37 is a flowchart (2) of the process performed when an up packet is received from a mobile device;

FIG. 44 shows loading a program to a computer to realize the present invention.

DETAILED DESCRIPTION OF THE PREFERRED EMBODIMENTS

Figure 1:
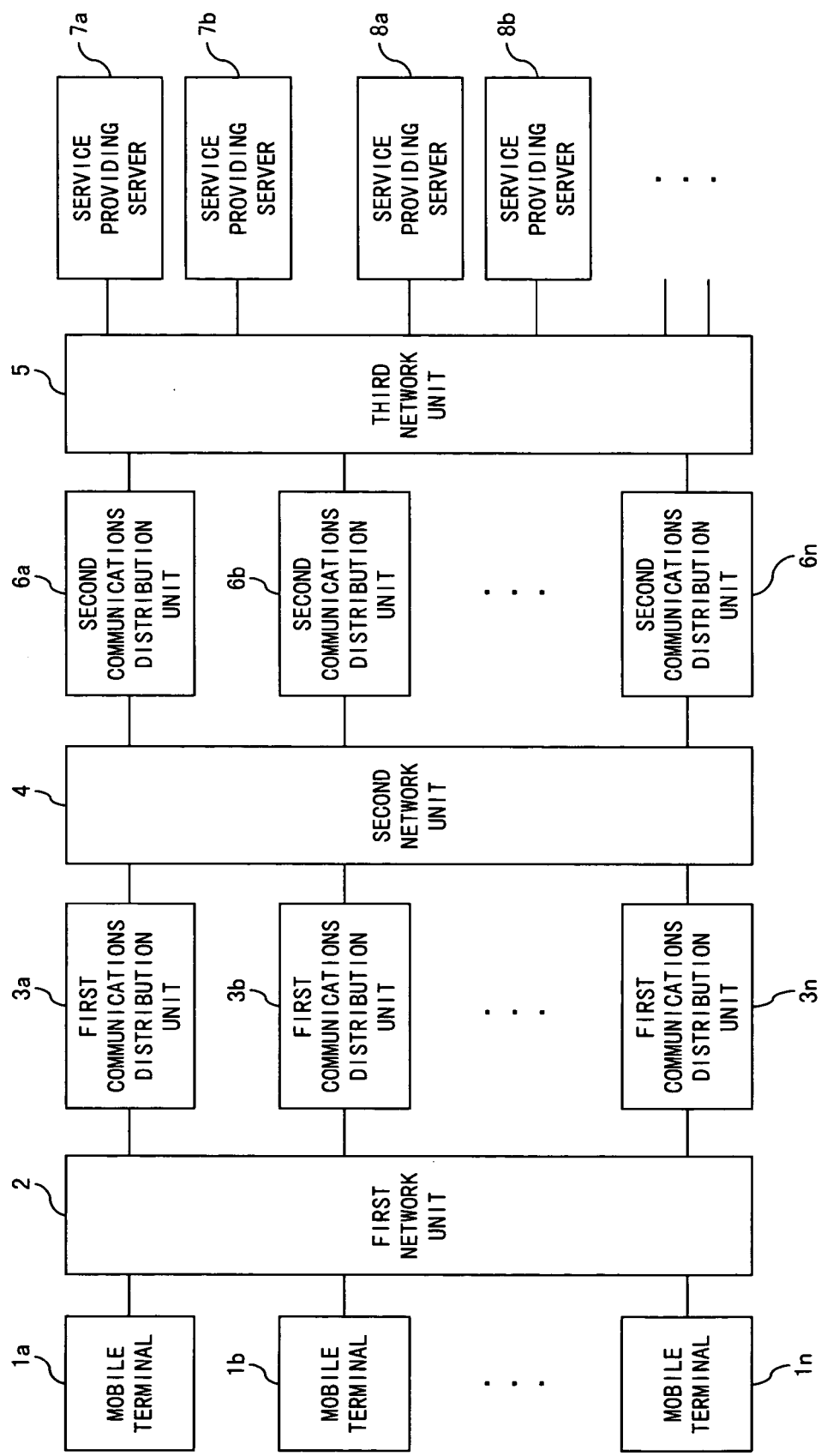
FIG. 1 is a block diagram of the configuration showing the principle of the mobile device communications system according to the present invention.
Figure 2:
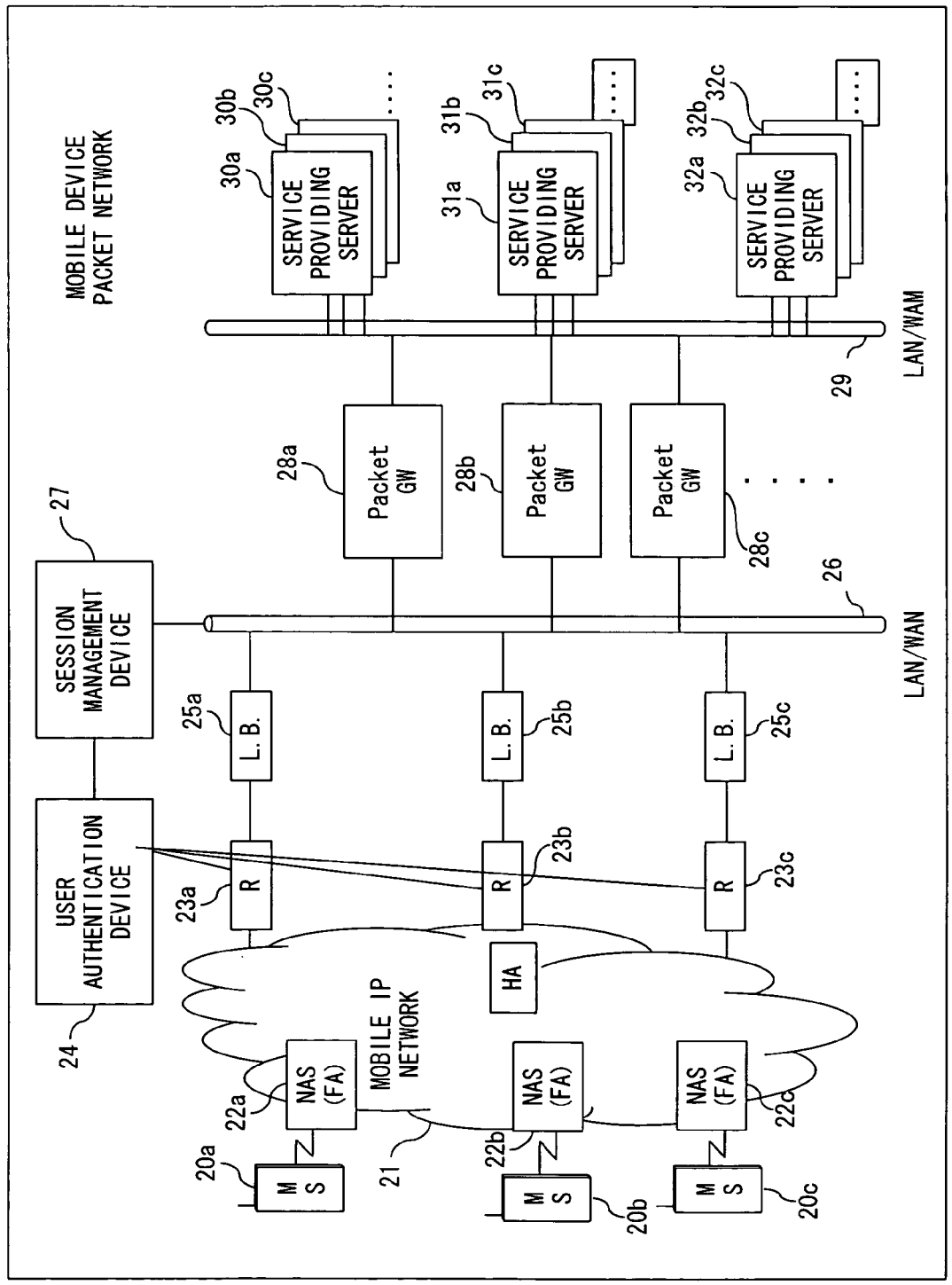
FIG. 2 is a block diagram of the system configuration of a mobile device packet network according to the first embodiment of the present invention.

FIG. 2 is a block diagram of the system configuration of the mobile device packet network according to the first embodiment of the present invention. In this system, mobile devices (MS), for example, mobile phones 20a, 20b, ... are connected to, for example, a mobile IP network 21 through network access devices (NAS) or foreign agents (FA) 22a, 22b, ... by wireless or cable.

There is a plurality of, for example, three input/output points on the service providing server side, and the input/output points are respectively connected to routers (R) 23a, 23b, ... and load balancers (L.B.) 25a, 25b, ... as shown in FIG. 2. The load balancers (L.B.) are connected to a local area network or wide area network (LAN/WAN) 26.

In the first embodiment, the communications between the mobile device and the service providing server are managed in a session format by generally one or more TCP connections described later.

The system is provided with a user authentication device 24 for managing users and a session management device 27 for managing the session of the transmission/reception of a series of packets from the access of a mobile device to the mobile IP network 21 to the completion of necessary communications. The user authentication device 24 is connected to, for example, the routers (R) 23a, 23b, ... of the input/output points of the network 21 on the service providing server side, and is also connected to the session management device 27.

The session management device 27 and a plurality of packet gateway (GW) devices 28a, 28b, ... are connected to the local area network or wide area network (LAN/WAN) 26 to which the load balancers (L.B.) 25a, 25b, ... are connected. These packet gateway devices have the most significant functions in the embodiments of the present invention as described later.

Each packet gateway device is connected by a number of service providing servers and LAN/WAN 29. It is assumed that a number of service providing servers respectively belongs to same groups. For example, service providing servers 30a, 30b, ... make a group, and the servers in the group are to provide the same services, and the mobile devices establish communications using the representative address of the group as described later. For example, service providing servers 31a, 31b, ... provide services different from those provided by service providing servers 32a, 32b, ...

Figure 3:
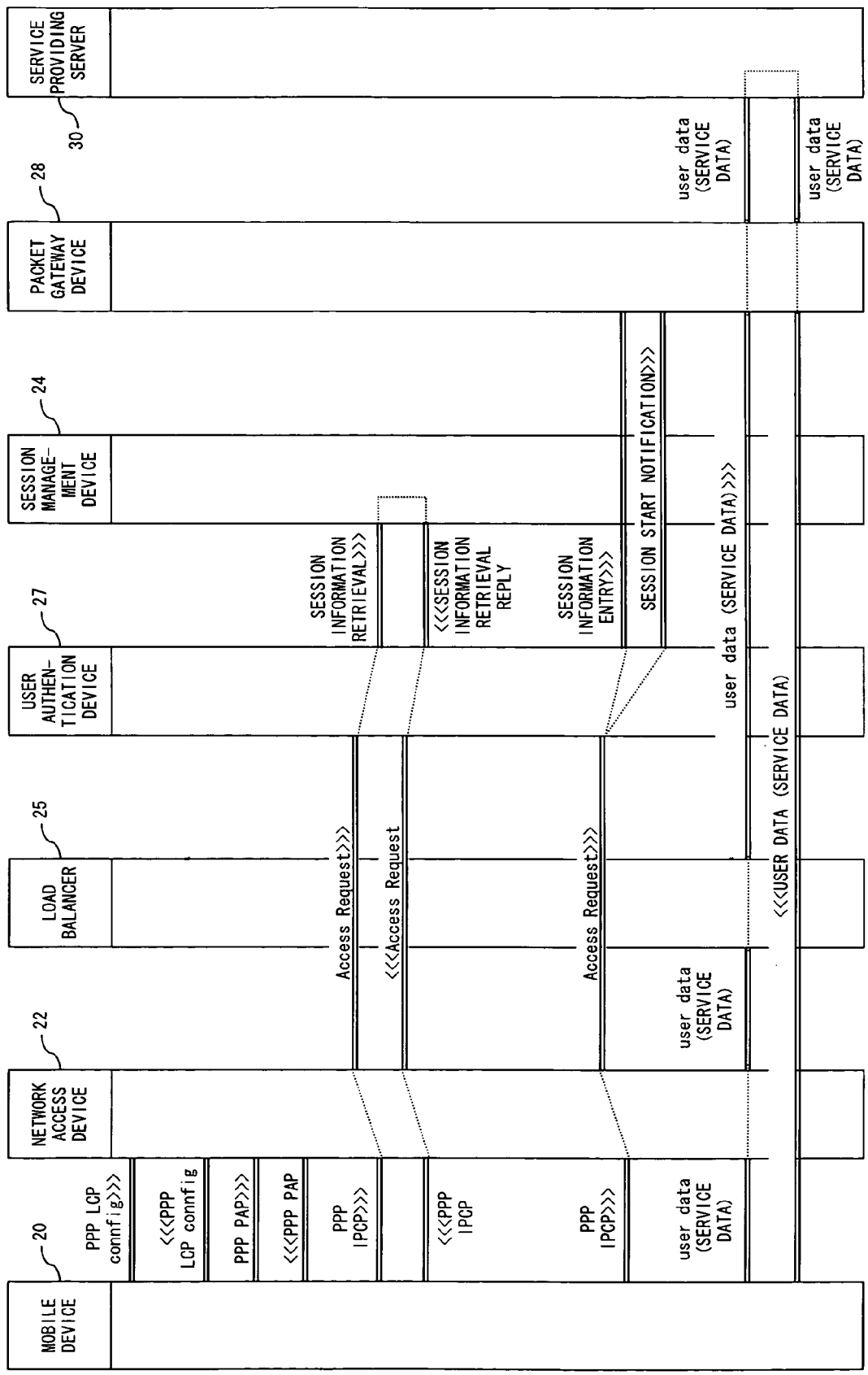
FIG. 3 shows the sequence of the processes between the apparatuses when a session starts.

FIG. 3 shows the sequence of the processes performed among apparatuses when a session starts in the system shown in FIG. 2. The sequence of the processes shown in FIG. 3 are performed among the mobile device 20, the network access device 22, the load balancer 25, the user authentication device 24, the session management device 27, the packet gateway device 28, and the service providing server 30.

The packet format and the packet sequence of the packet communications among the mobile device 20, the network access device 22, and the user authentication device 24 are in accordance with the protocol suggested in the diameter mobile IP extensions of the Internet draft, and the detailed explanation is omitted here.

On the other hand, the packet sequence and the packet format among the user authentication device 24, the session management device 27, and the packet gateway device 28 are processed regardless of the provisions, and are specific to the present embodiment.

In FIG. 3, in accessing the mobile IP network 21 from the mobile device 20, the network access device 22 transmits an access request prescribed by the above-mentioned protocol to the user authentication device 24.

Figure 4:
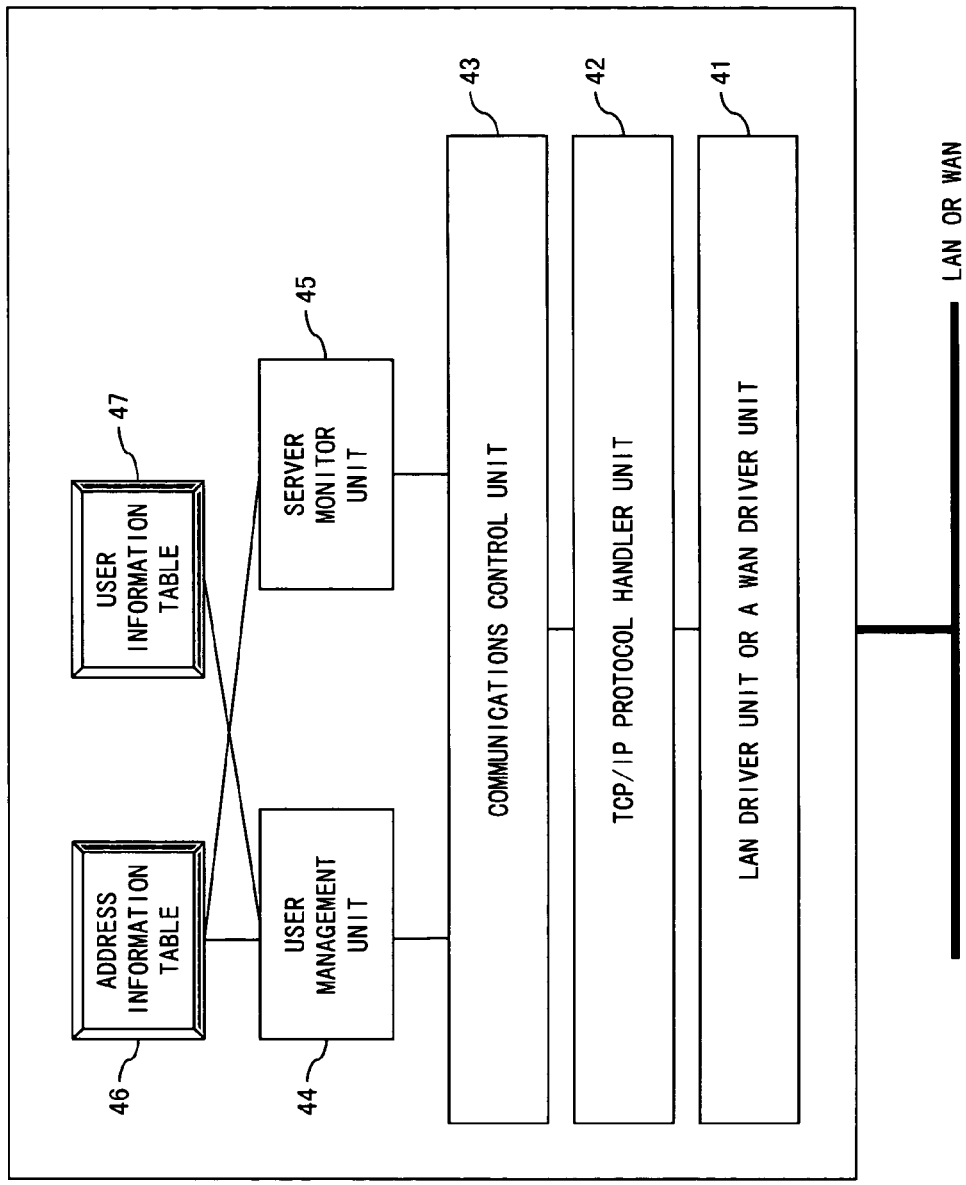
FIG. 4 is a block diagram of the configuration of the user authentication device.

FIG. 4 is a block diagram of the configuration of the user authentication device. The user authentication device is configured by a LAN driver unit or a WAN driver unit 41, a TCP/IP protocol handler unit 42, a communications control unit 43, a user management unit 44, and a server monitor unit 45, and further provided with an address information table 46 managed by the user management unit 44 and the server monitor unit 45, and a user information table 47 managed by the user management unit 44. A LAN or a WAN connected to the LAN driver unit or a WAN driver unit 41 corresponds to the network 26 connected through the session management device 27 as shown in 2, or the mobile IP network 21 connected through the routers (R) 23a, 23b, ...

The TCP/IP protocol handler unit 42 includes a user datagram protocol (UDP) and all of the TCP/IP protocol set.

Figure 5:
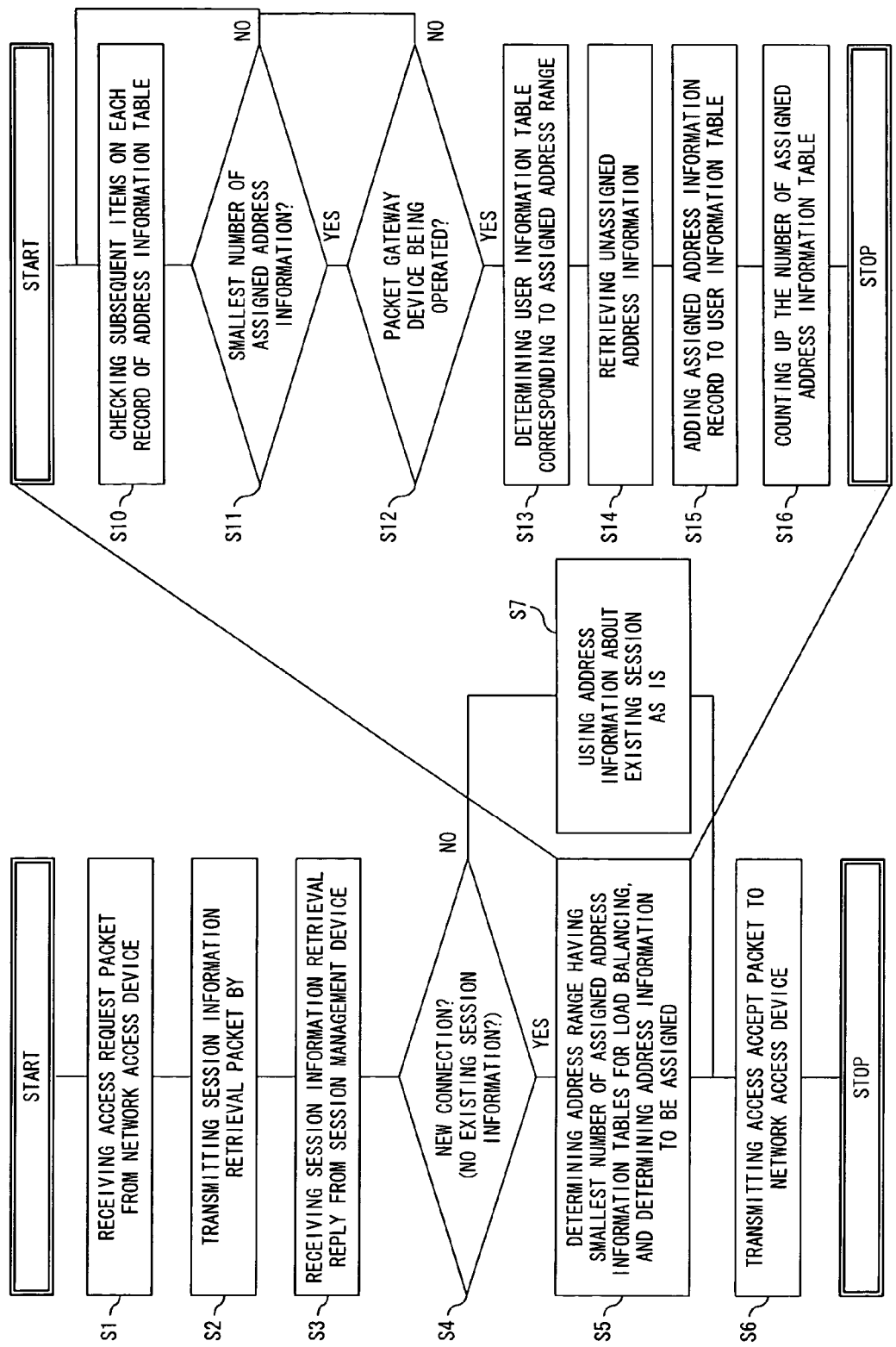
FIG. 5 shows an example of a flowchart of the address assigning process by the user authentication device.

FIG. 5 is a flowchart of the address assigning process of the user authentication device. In this process, the process of assigning or retrieving an IP address to the session to be or already started in response to the access request received from the network access device 22 is performed.

When the process is started as shown in FIG. 5, first in step S1, an access request packet from the network access device 22 is received, and a session information retrieval packet is transmitted in step S2 by the user management unit 44 to the session management device 27 as shown in FIG. 3. In step S3, a session information retrieval reply packet is received from the session management device 27.

FIG. 6 shows the packet format of a packet to be explained later in addition to the session information retrieval packet and the session information retrieval reply packet. The session information retrieval packet stores the type of session information retrieval as a packet type after the TCP/IP header, and stores mobile device identification information as trailing information in the packet. The mobile device identification information corresponds to an identifier, and not a phone number, for identifying each mobile device. This identification information is assumed to be retrieved from, for example, an access request packet.

The session information retrieval reply packet stores a TCP/IP header, a session information retrieval reply indicating a packet type, mobile device identification information (identifier), a retrieval result indicating whether or not there is a record of a session corresponding to the mobile device identifier, and, if there is the record, an IP address assigned to the session.

Back in FIG. 5, it is determined in step S4 whether or not there is a new connection. In a new connection, the session information table does not store the record of the session corresponding to the mobile device identifier. In this case, an address to be assigned is determined in step S5.

The determination is described in detail in steps S10 through S16. In order to balance the load, the record having the number of addresses in the smallest address range assigned in the address information table 46 is retrieved, an address to be assigned is determined, and an access accept packet is transmitted to the network access device 22 in step S6, thereby terminating the process.

If it is not a new connection in step S4, that is, if a session corresponding to the mobile device identifier has been entered in the session information table, then the IP address corresponding to the session is used as is in step S7, and the access accept packet is transmitted in step S6, thereby terminating the process.

As described above, a session refers to the transmission/reception of a series of packets up to the user log-out by a mobile device using an IP address assigned by the user authentication device 24. Therefore, when a user is provided with different services in a session, a plurality of TCP connections corresponding to each service are contained in the session.

FIG. 7 shows an example of the storage data of the address information table 46. In FIG. 7, the distribution range of an IP address assigned to a mobile device basically corresponding to a session is stored with the load balancing of the packet gateway (GW) devices 28*a*, 28*b*, . . . shown in FIG. 2 taken into account. For example, when the load is equally balanced, the distribution range is determined such that the number of addresses in the distribution range can be equal.

Therefore, the address information table 46 stores the distribution range of the IP address, the number of assigned IP addresses in the range, the operation state as to whether or not each packet gateway device is being operated, and the address of the user information table as a pointer to the user information table 47 storing an IP address assigned corresponding to each packet gateway device, etc.

FIG. 8 shows an example of the stored data in the user information table 47. In FIG. 8, a user identifier, a password, mobile device identification information, and a phone number are stored as user identification information corresponding to the four IP addresses already assigned in the IP address distribution range for the packet gateway device Pgw2 shown in FIG. 7.

Back in FIG. 5, the details of the process in step S5, that is, the processes in steps S10 through S16 are described below. When the process is started, the subsequent steps S11 and S12 are checked in step S10 on each record of the address information table.

In step S11, it is determined whether or not the number of pieces of already assigned address information is the smallest. If the smallest number can be detected, then it is determined in step S12 whether or not the operation state of the packet gateway device corresponding to the record is normal. If it is normally operated, then control is passed to step S13. If it is not being operated, the processes in and after step S10 are repeated.

That is, it is determined whether or not the packet gateway device corresponding to the second smallest number of already assigned IP addresses is being operated. If it is being operated, then control is passed to the processes in and after step S13.

In step S13, the address of the user information table corresponding to the address distribution range of the retrieved record, that is, the IP address assigned by the pointer is retrieved, the address not assigned in the distribution range is retrieved in step S14, the record corresponding to the IP address is added to the user information table in step S15, the number of assigned IP addresses of the records of the packet gateway device corresponding to the IP address added in the address information table is incremented in step S16, thereby terminating the process.

Figure 9:
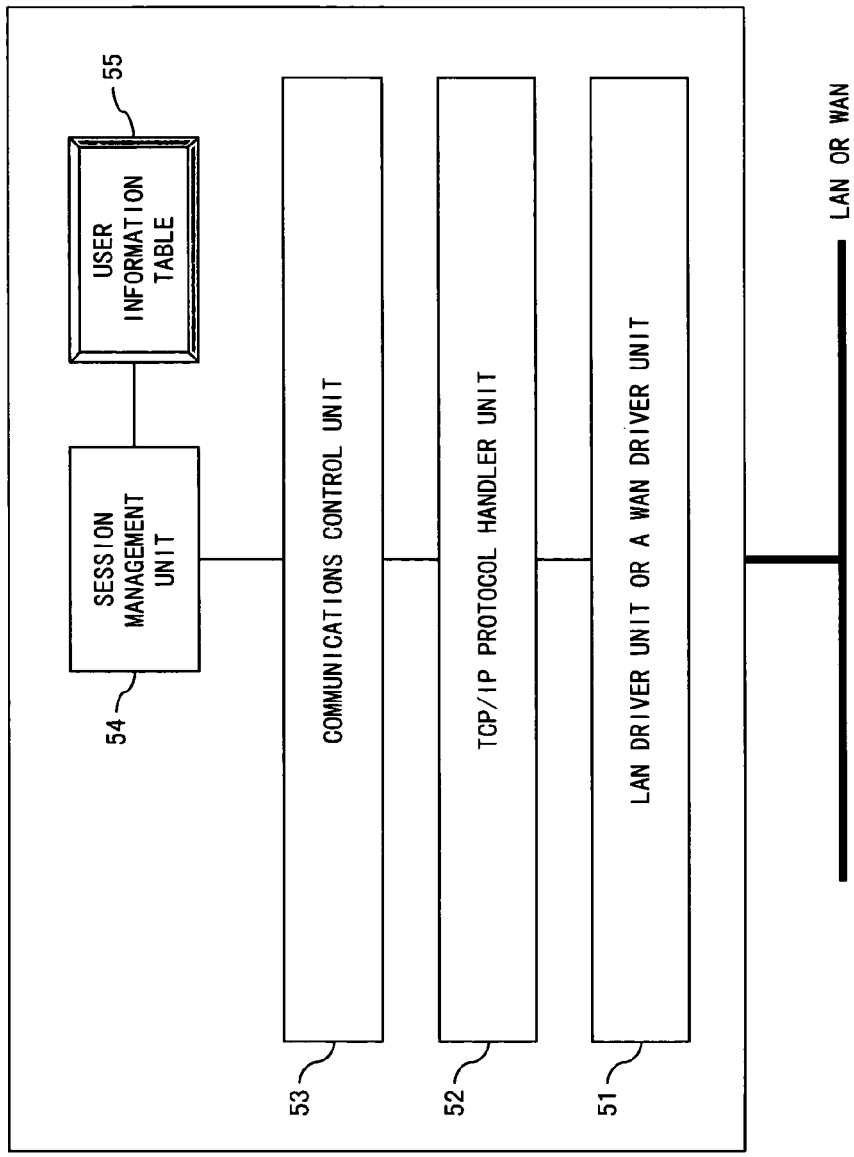
FIG. 9 is a block diagram of the configuration of the session management device.

FIG. 9 is a block diagram of the configuration of the session management device 27 shown in FIG. 2. In FIG. 9, the session management device comprises a LAN driver unit or a WAN driver unit 51, a TCP/IP protocol handler unit 52, a communications control unit 53, a session management unit 54, and a session information table 55 managed by the session management unit 54.

FIG. 10 shows an example of data stored in the session information table 55. In FIG. 10, the session information table 55 stores a session identifier, a mobile device identifier, an assigned IP address, and a session state of "Act" indicating "in session".

The session management unit 54 searches the session information retrieval packet using the mobile device identification information as a key when it receives a session information retrieval packet from the user authentication device 24 as shown in FIG. 3, and returns the result as a session information retrieval reply packet explained by referring to FIG. 6 to the user authentication device 24.

Based on the reply, the user management unit 44 of the user authentication device sets a new IP address or an already assigned IP address as access accepted, and transmits it to the network access device 22.

The user authentication device 24 assigns an IP address in the process according to the flowchart shown in FIG. 5 to perform load balancing of the packet gateway device being operated as described above each time it receives an access request. Whether or not the packet gateway device is being operated is monitored by the server monitor unit 45 of the user authentication device as a health check at, for example, predetermined intervals, and the monitored state is stored in the address information table.

After the assignment of the IP address, the user authentication device 24 receives an account start from the network access device 22, transmits a session information entry packet from the user management unit 44 to the session management device 27, and transmits a session start notification packet to the packet gateway device 28 corresponding to the assigned IP address.

The packet formats of the session information entry packet and the session start notification packet are shown in FIG. 6. In FIG. 6, the session information entry packet stores data, that is, a header, a session information entry as a packet type, mobile device identification information, and an IP address in this order, and the session start notification packet stores a header, a session start notification as a packet type, mobile device identification information, and an IP address.

The session management unit 54 of the session management device shown in FIG. 9 enters in the session information table 55 a record corresponding to a new session when it is started, and sets the session state as "Act". A session information table is also provided in the packet gateway device described later, and the contents are the same as those shown in FIG. 10. The session management unit in the packet gateway device also enters the record corresponding to a new session.

The session management device 27 performs session state management through the session management unit 54 during the period from the reception of a session information entry packet from the user authentication device 24 to the reception of a status change (close) described. In this session state management, the session state is managed as one of the four states, that is, "None" indicating that the session has not been entered yet, "Act" indicating in-session, "Dormant" indicating a non communications in a predetermined period, and "Close" indicating the session termination state.

FIG. 11 shows the state transition of a session state managed by the session management device. In FIG. 11, when a session is started in response to the session information entry by the user authentication device 24, the session information indicates "Act". In this state, the dormant timer described later times out, and upon receipt of a status change (stop) from the user authentication device 24, the session status changes into "Dormant".

Otherwise, as described later, for example, when a user terminates the communications, that is, when a status change (close) in response to the user log-out is received the user authentication device 24, the session status changes into "Close" as shown by 3 in FIG. 11.

Although not directly related to the present invention, the mobile device packet network constantly monitors whether or not the communications with a mobile device can be performed, which is called "interim". If the communications with the mobile device can be performed, then information that the communications can be performed for relatively long intervals, for example for 30-minute intervals, is transmitted to the network access device 22 shown in FIG. 2. The information is transmitted as a status change (interim) from the user authentication device 24 to the session management device 27. When the information is valid, the session state maintains "Act" as shown by 6 in FIG. 11. If a timeout of the interim monitor timer occurs before the status change (interim) is input from the user authentication device 24, then session status changes from "Act" to "Close" as shown by 8 in FIG. 11.

When the session state becomes "Dormant", the session timer is activated as described later. If a packet from a user to a service providing server is input to the network before the timeout of the session timer occurs, then the user authentication device 24 inputs a status change (start) as shown by 5 in FIG. 11, and the session state becomes "Act" again.

When a timeout of the session timer occurs when the session state indicates "Dormant", the session status changes from "Dormant" to "Close" as shown by 7 in FIG. 11. Furthermore, for example, when the user terminates the communications as described above, a status change (close) is input from the user authentication device 24, and the session status changes into "Close".

When the session state becomes "Close" and the session log indicating the data of the session is output, the session status changes from "Close" to "None" as shown by 4 in FIG. 11. When the session log is output, the corresponding record in the session information table which is changed into "Close" is output to the log file, and the entry is deleted.

Figure 12:
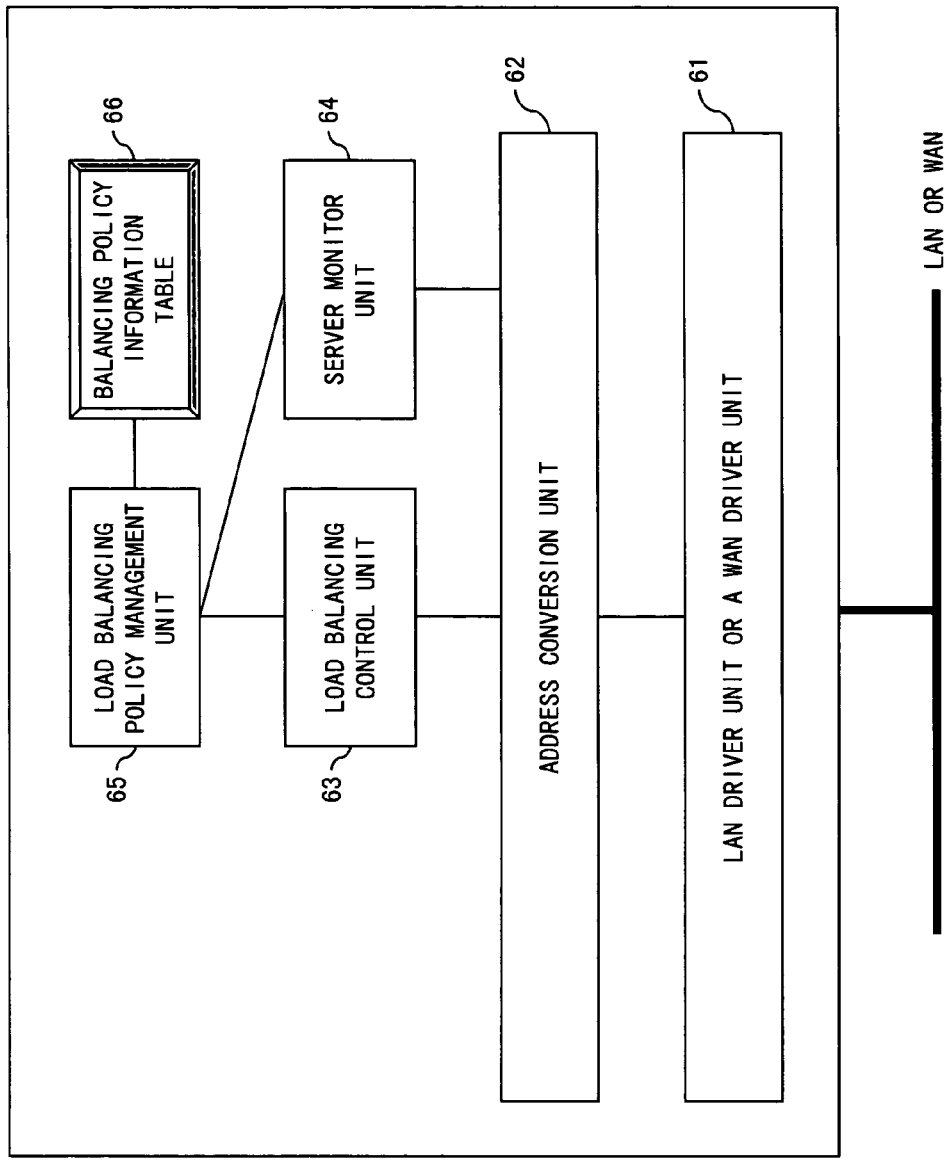
FIG. 12 is a block diagram of the configuration of the load balancer.

Described below is the operation of the load balancer (L. B.) 25 shown in FIG. 2. FIG. 12 is a block diagram of the configuration of the load balancer. In FIG. 12, the load balancer comprises a LAN driver unit or a WAN driver unit 61, an address conversion unit 62, a load balancing control unit 63, a server monitor unit 64, a load balancing policy management unit 65, and a balancing policy information table 66 managed by the load balancing policy management unit 65.

As shown in FIG. 2, the load balancer (L. B) determines to which packet gateway (GW) devices 28a, 28b, . . . the data packet transmitted from the mobile device is distributed to. The L. B transmits the data packet through the local area network or wide area network (LAN/WAN) 26, and rewrites the address portion of the packet for the transfer of the packet, thereby performing load balancing for the packet gateway device.

The load balancer analyzes the communications protocol of the passing packet, and changes the state of the TCP connection, that is, "connected", "unconnected", "wait for connection", etc., for example, from "unconnected" to "connected" for the connection-oriented protocol (TCP protocol), thereby managing the TCP connection.

When a connection is made, a packet gateway device to which a packet is to be distributed is determined based on the contents of the balancing policy information table 66. The contents of the balancing policy information table 66 are the same in any of the load balancers (L.B.) 25a, 25b, . . . shown in FIG. 2.

As shown in FIG. 3, the network access device 22 starts packet communications in which a user data packet from the mobile device 20 is transmitted to a service providing server after access acceptance from the user authentication device 24 is received. The load balancer provided on the route between the network access device 22 and the service providing server receives a user data packet and performs load balancing by distributing the packet to any of a plurality of packet gateway devices.

Figure 13:
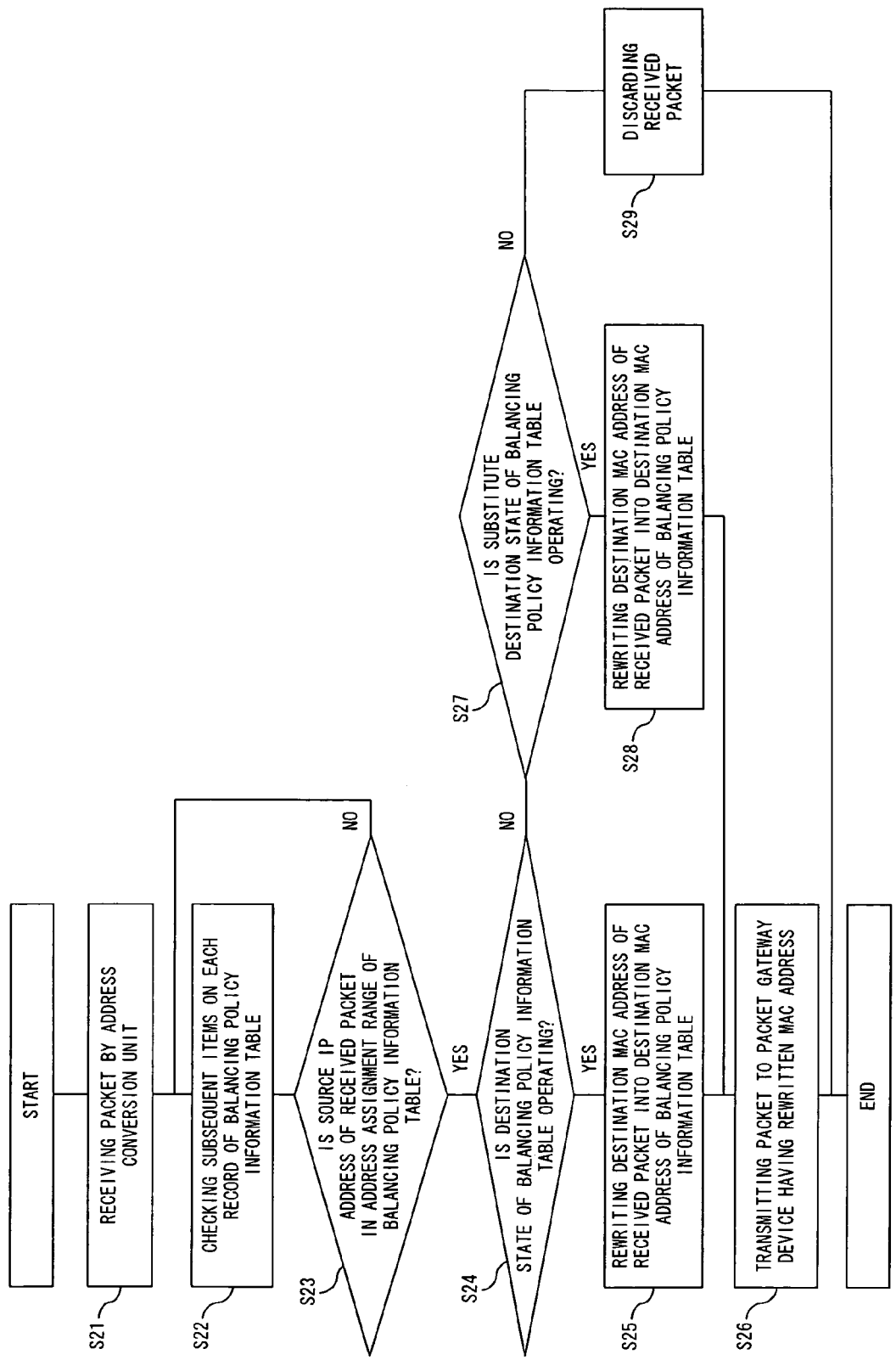
FIG. 13 shows an example of a flowchart of the load balancing process by the load balancer.

FIG. 13 is a flowchart of the process performed by the load balancer. When the process is started as shown in FIG. 13, a packet is received by the address conversion unit 62 shown in FIG. 12 first in step S21. In steps S22 and S23, the process of retrieving a record whose source IP address of the received packet is in the address distribution range is performed on each record of the balancing policy information table 66.

FIG. 14 shows an example of the data stored in the balancing policy information table. In FIG. 14, as described above, the destination MAC address, the destination state, the substitute destination MAC address 1, and the destination state are stored corresponding to the distribution range of the IP address uniquely assigned to the session identification information and mobile device identification information.

The destination MAC address is an address of any of the packet gateway (GW) devices 28a, 28b, . . . shown in FIG. 2, and the destination state shows whether or not the packet gateway is normally operating.

The substitute destination MAC address 1 is an address of a substitute packet gateway device to which the data packet having an IP address as a source address in the IP address of the record is to be distributed when the packet gateway specified by the destination MAC address of the record goes down.

Although not shown in FIG. 14, when the packet gateway specified by the substitute destination MAC address 1 also goes down, the address of another substitute packet gateway can be stored.

Back in FIG. 13, when a record whose source IP address is in the address distribution range is retrieved in the processes in steps S22 and S23, it is determined in step S24 whether or not the state of the packet gateway specified by the destination MAC address of the record is normal, that is, in operation. If it is normal, then the destination MAC address of the received packet is rewritten into the destination MAC address of the record in step S25, and the packet is transmitted to the packet gateway device having the rewritten MAC address in step S26, thereby terminating the process. The storage position of the MAC address in the packet is described later.

If the state of the packet gateway device specified by the destination MAC address is not normal in step S24, it is determined in step S27 whether or not the state of the packet gateway specified by the substitute destination MAC address 1 for the record is normal. If it is normal, the destination MAC address is rewritten into the substitute destination MAC address 1 as in step S25, the packet is transmitted to the gateway device in step S26, thereby terminating the process.

Furthermore, when the state of the packet gateway device as the substitute destination is not normal in step S27, the received packet is rejected in step S29, thereby terminating the process. As a result, a packet is retransmitted in the case of the TCP connection. However, if one of the destination and substitute destination is restored to a normal state, then the retransmitted packet is transmitted to the restored packet gateway, thereby continuing the normal process. If the packet gateway device remains abnormal, the retransmitted packet remains rejected, and finally the TCP connection is disconnected.

Figure 15:
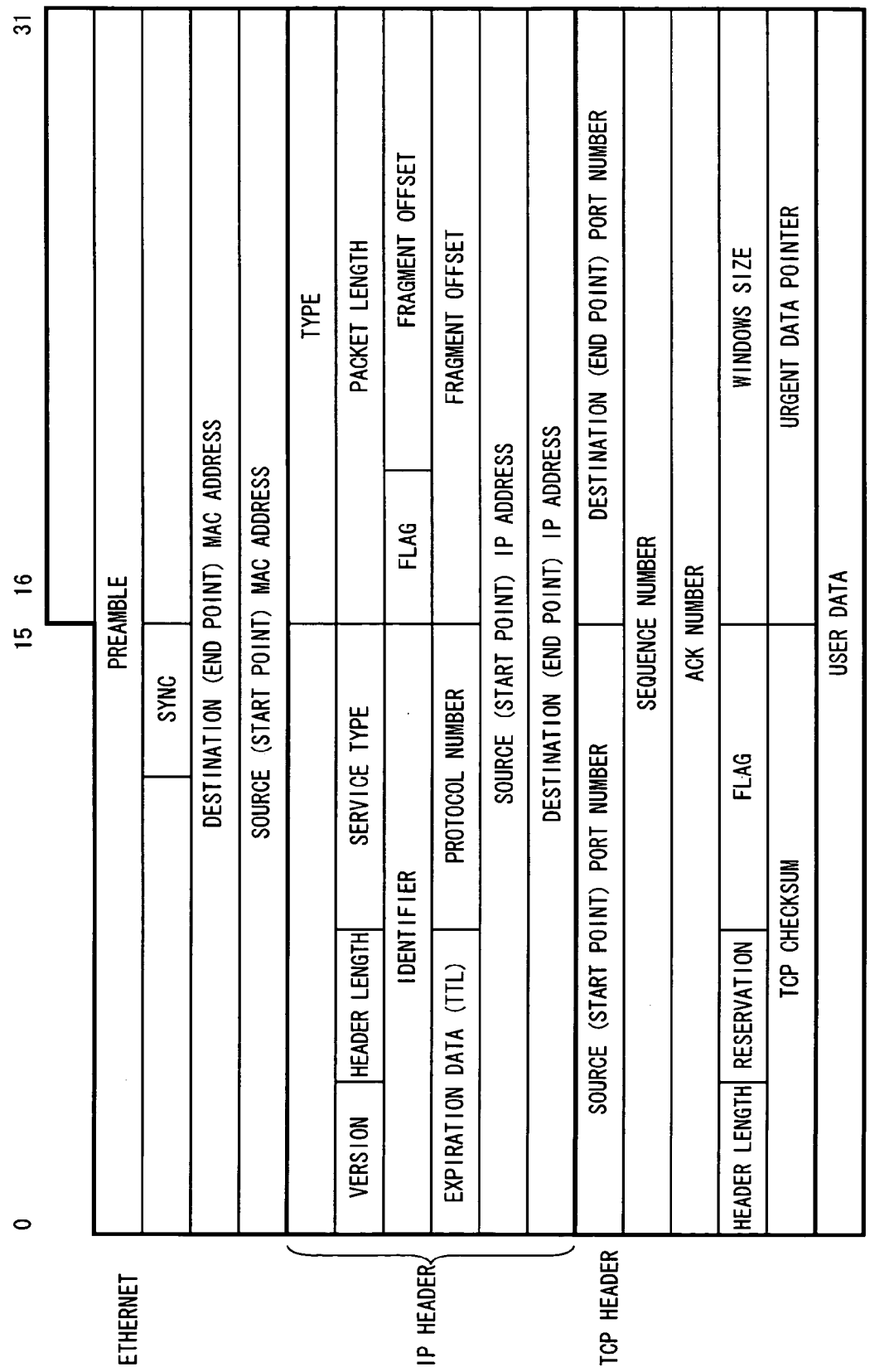
FIG. 15 shows an example of a data format of the packet header.

FIG. 15 shows an example of a data format of the TCP/IP packet. In FIG. 15, the portion corresponding to the Ethernet frame, that is, the IP header and the TCP header, are stored before the user data. The source IP address determined in step S23 shown in FIG. 13 is stored in the portion of the IP header, and the destination MAC address rewritten in steps S25 and S28 is stored in the portion corresponding to the Ethernet frame. The above-mentioned data format is based on the following document.

Document) Internet Standard Quick Reference by Masami Nosaka, O'Reilly Japan

Figure 16:
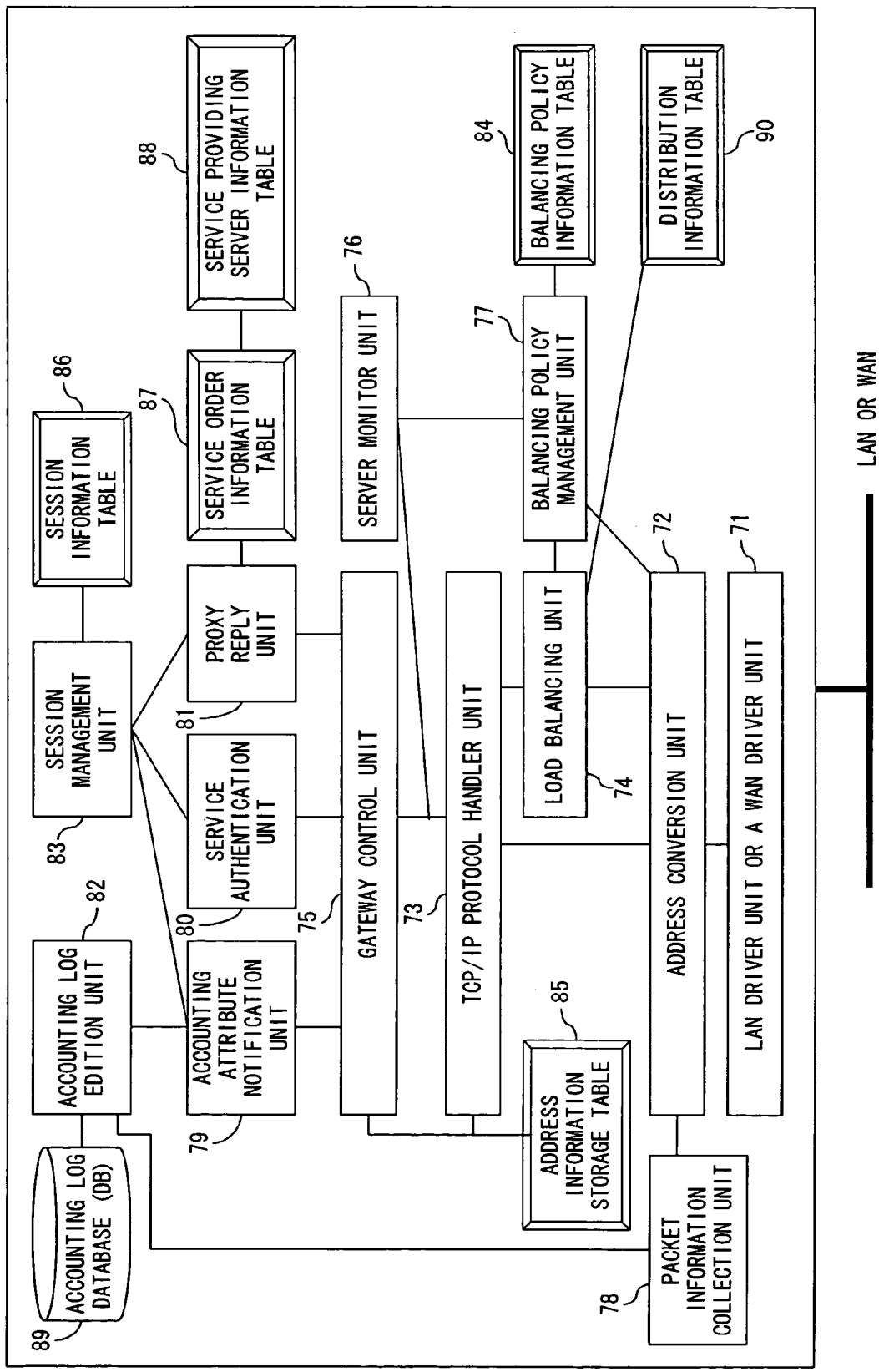
FIG. 16 shows the configuration of the packet gateway device.

FIG. 16 is a block diagram of the configuration of the packet gateway device. As described above, the data packet communicated in a session between a mobile device and a service providing server in the system shown in FIG. 2 is communicated in the plurality of packet gateway (GW) devices 28a, 28b, . . . constantly through the same packet gateway device, and the packet gateway device performs load balancing for the service providing server, and various processes such as the service authenticating process, the accounting process, etc. as the most important device in the present embodiment.

In FIG. 16, the packet gateway device comprises a LAN driver unit or a WAN driver unit 71, an address conversion unit 72, a TCP/IP protocol handler unit 73, a load balancing unit 74, a gateway control unit 75, a server monitor unit 76, a balancing policy management unit 77, a packet information collection unit 78 for collecting necessary information for accounting, an accounting attribute notification unit 79 for retrieving a necessary attribute for accounting from a data packet, a service authentication unit 80 for determining whether or not a service for a mobile device can be provided, for example, a proxy reply unit 81 for notifying the mobile device that, for example, no services can be admitted, an accounting log edition unit 82 for editing an accounting log, a balancing policy information table 84 managed by the balancing policy management unit 77, an address information storage table 85 storing the necessary address for an address conversion of the address conversion unit 72, a session information table 86 managed by the session management unit 83, a service order information table 87 referred to in a service authentication, etc., a service providing server information table 88, an accounting log database (DB) 89 storing an accounting log generated by the accounting log edition unit 82, and a distribution information table 90 storing a server to which a packet is actually distributed among the service providing servers capable of providing the same services corresponding to the TCP connection to the mobile device.

The distribution information table is used in sequentially distributing a packet to a server having the lowest CPU use rate in the service providing servers. The result is stored by periodically checking the CPU use rate, thereby distributing packets.

In FIG. 16, since the contents of the session information table 86 are the same as those of the session information table 55 in the session management device shown in FIG. 9. Although the balancing policy information table 84 has the same name as the balancing policy information table 66 in the load balancer, the contents relate to the balancing policy, to which of a plurality of service providing servers a packet is to be distributed, corresponding to each service type. Although an example of data is described later, the contents are different from those of the table shown in 14.

Furthermore, in FIG. 16, the TCP/IP protocol handler unit 73 and the gateway control unit 75, the gateway control unit 75 and the server monitor unit 76, and the server monitor unit 76 and the balancing policy management unit 77 are directly connected to each other.

Figure 17:
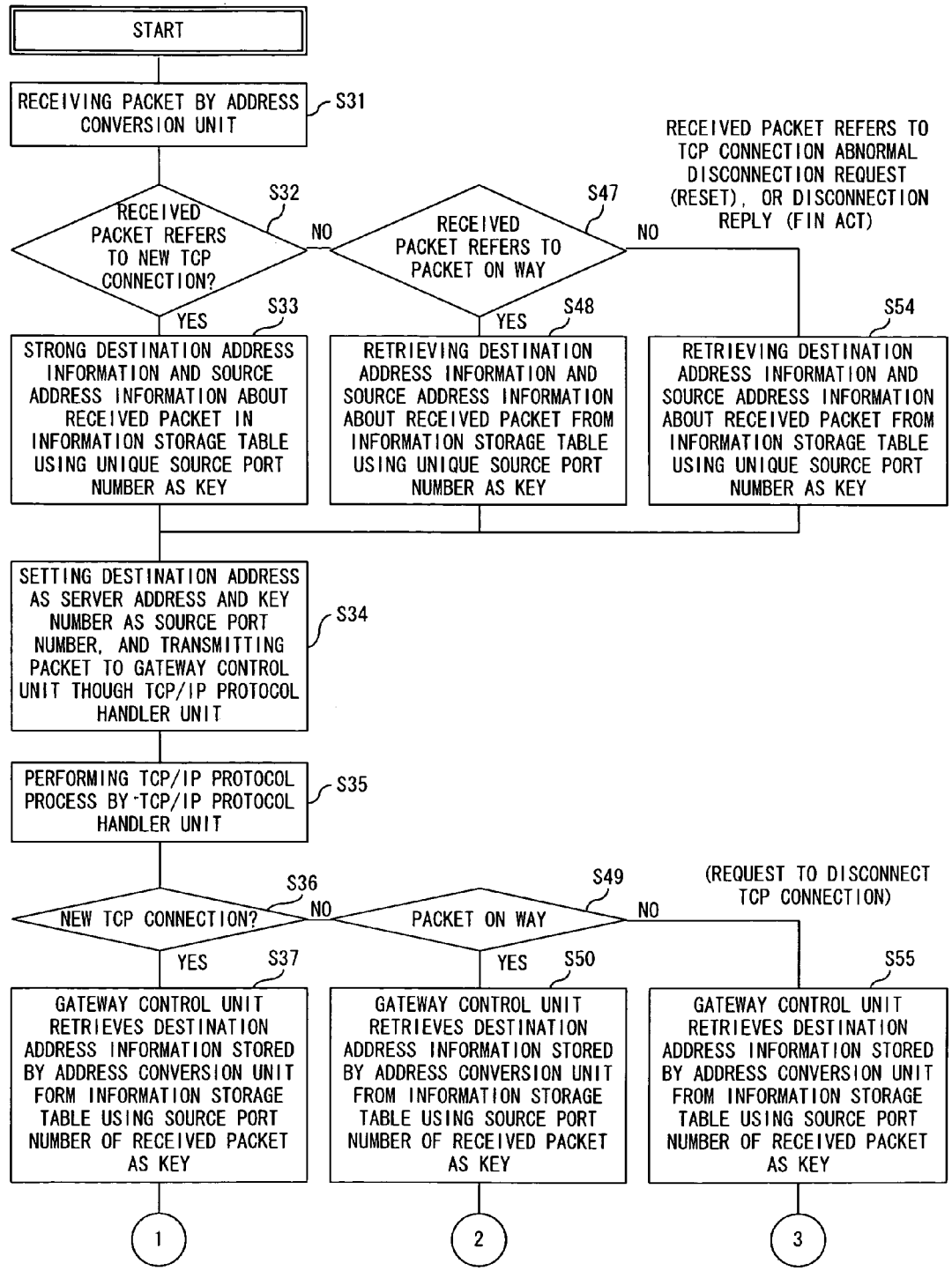
FIG. 17 is a flowchart (1) of the up packet distributing process by the packet gateway device.
Figure 18:
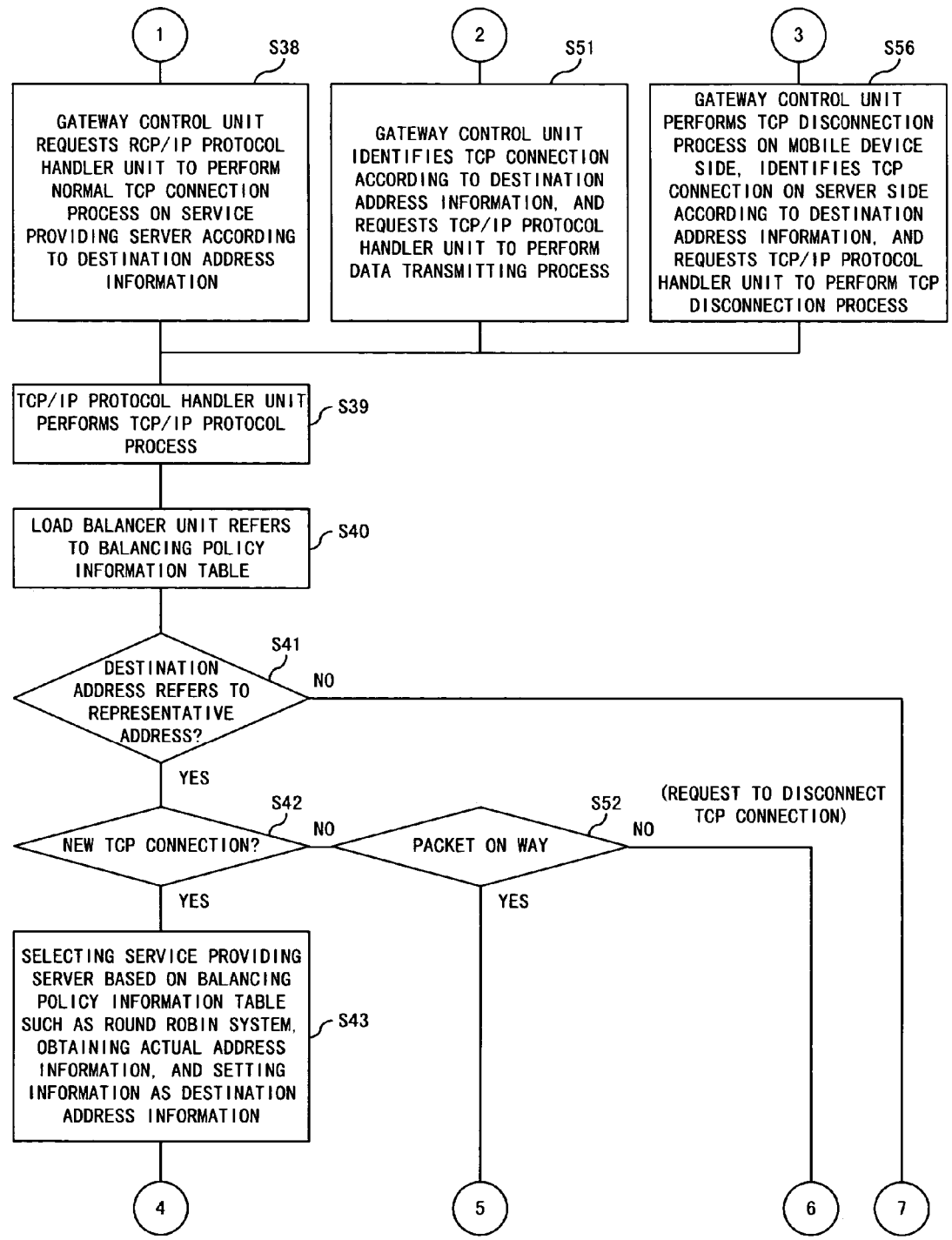
FIG. 18 is a flowchart (2) of the up packet distributing process by the packet gateway device.
Figure 19:
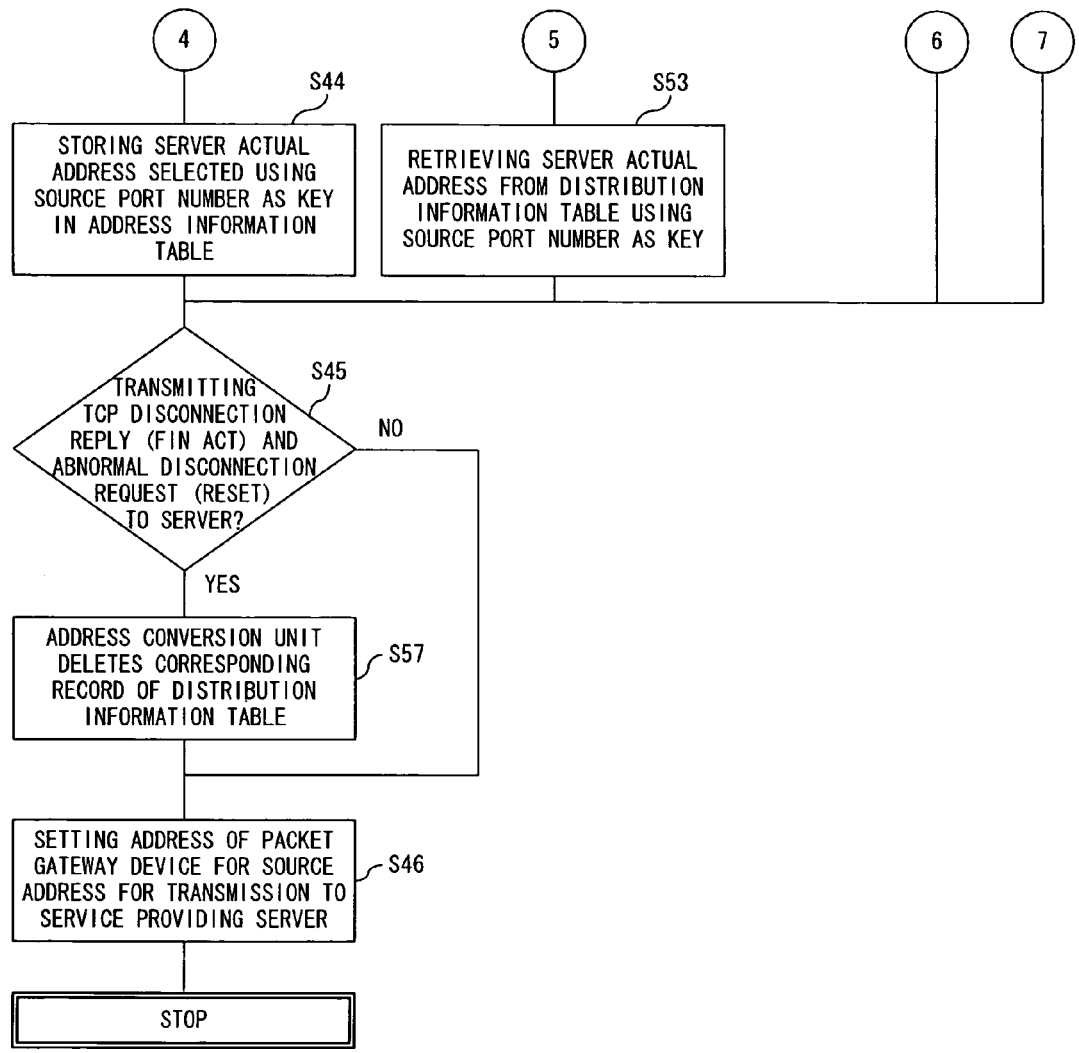
FIG. 19 is a flowchart (3) of the up packet distributing process by the packet gateway device.
Figure 20:
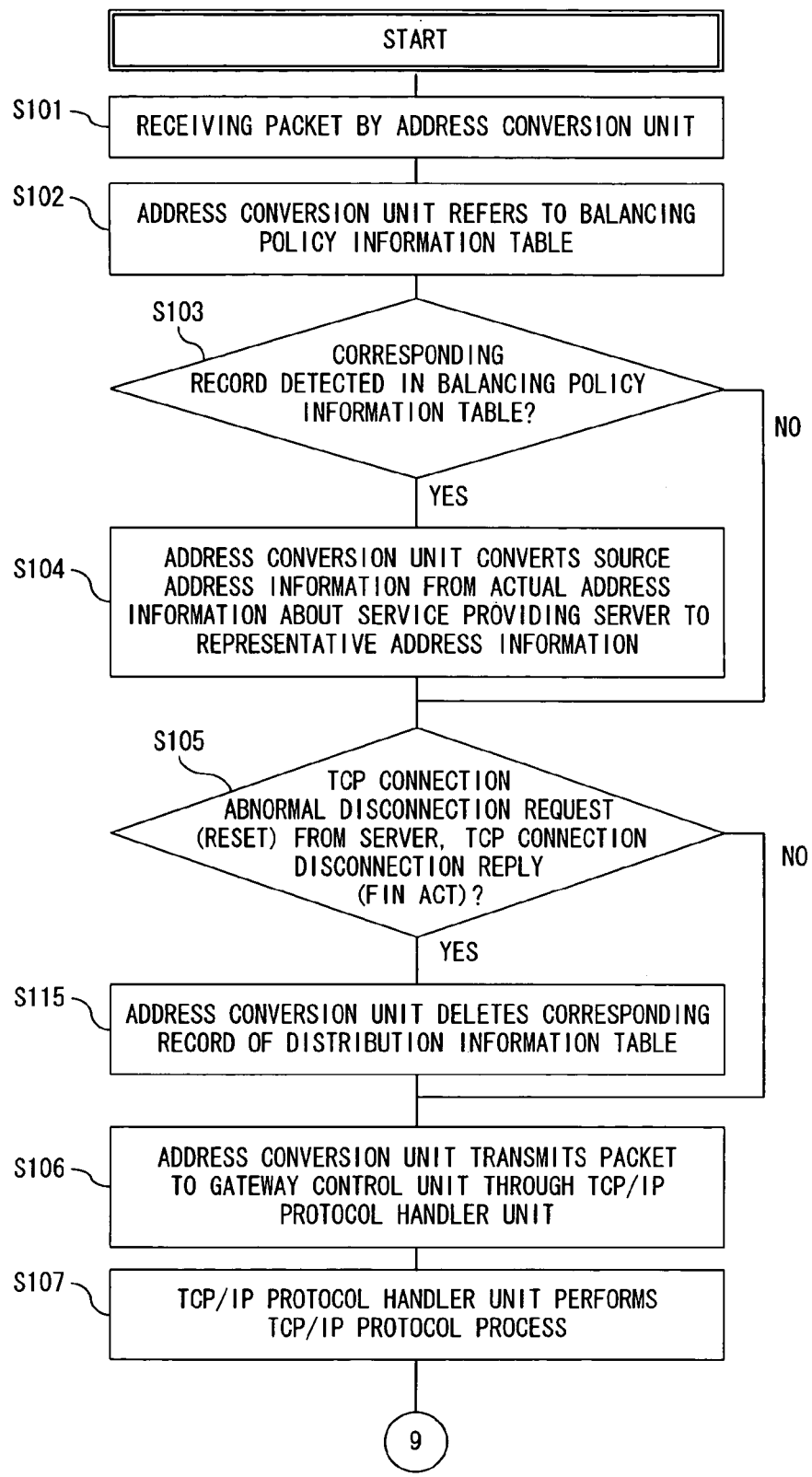
FIG. 20 is a flowchart (1) of the down packet distributing process by the packet gateway device.
Figure 21:
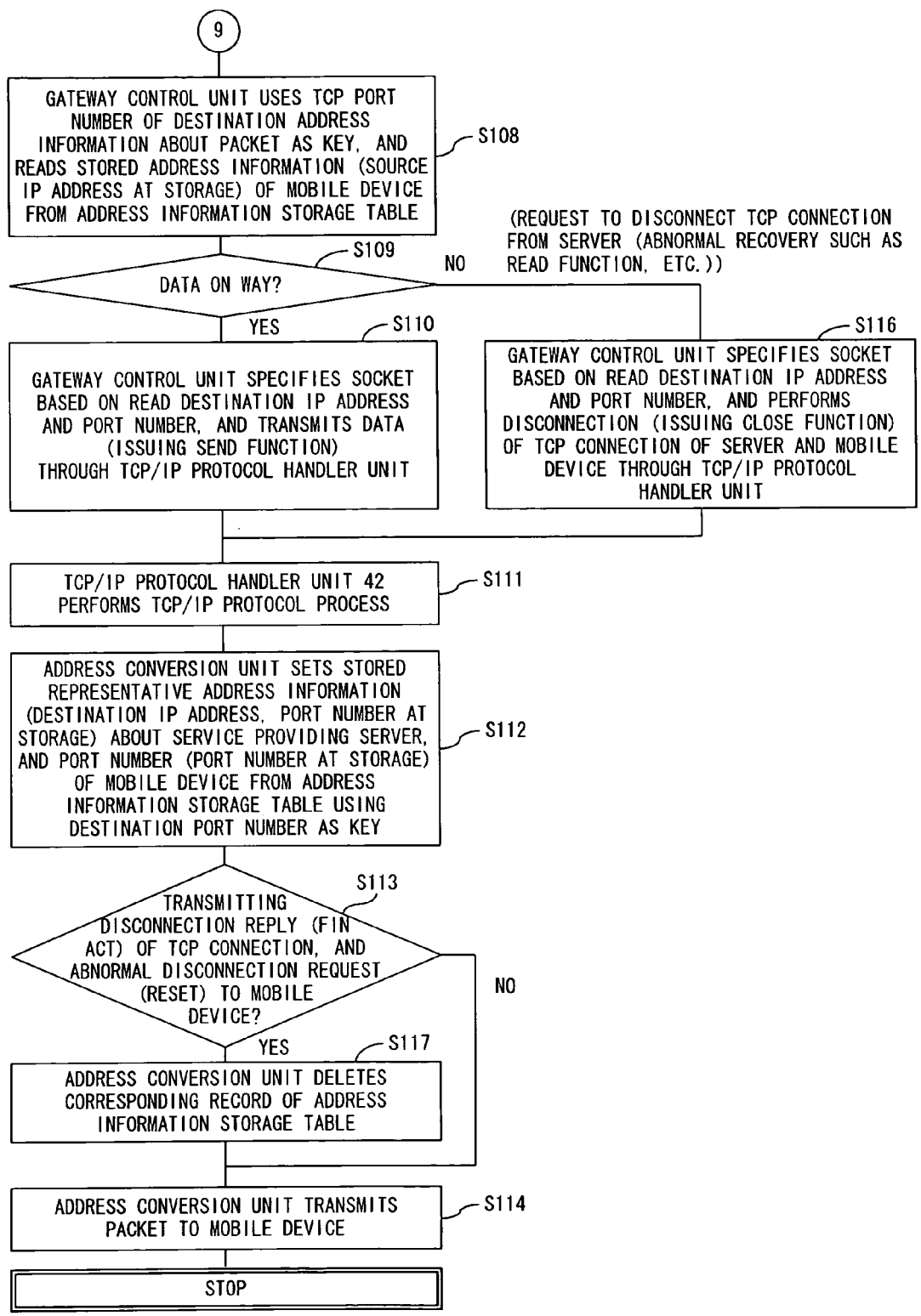
FIG. 21 is a flowchart (2) of the down packet distributing process by the packet gateway device.

FIGS. 17 through 21 are flowcharts of the packet distributing process performed by the packet gateway device. FIGS. 17 through 19 show the process performed on the packet from a mobile device to a service providing server, that is, an up packet. FIGS. 20 and 21 show the process performed on a down packet from a service providing server to a mobile device. These process flowcharts are described below by referring to FIGS. 22 and 23.

FIG. 22 shows an example of the data stored in the address information storage table 85 in the packet gateway device, and FIG. 23 shows an example of the data stored in the balancing policy information table 84. Before explaining the processes of the flowcharts shown in FIGS. 17 through 21, the contents stored in the tables are explained below first.

The address information storage table shown in FIG. 22 stores the source IP address, the source port number, the destination IP address, and the destination port number as the stored address information corresponding to the unique key information used in storing the source address, etc. stored in the packet when the process of rewriting the destination address of the packet, etc. in the packet gateway device as described later.

The balancing policy information table shown in FIG. 23 stores the representative IP address of the group of service providing servers depending on the provided service type, the number of actual servers, the IP addresses of actual servers, the service types in this embodiment, for example, the IP addresses of the actual server 1 and the actual server 2 as the addresses of the two service providing servers of the groups corresponding to mail and chats, and "normal" indicating that the state of the server indicating whether or not the server is being operated is "operating". As the balancing policy, two actual servers are used, for example, alternately to distribute packets.

FIGS. 17 through 19 are flowcharts of the process of distributing an up packet by the packet gateway device, that is, a packet transmitted to a service providing server from the mobile device (load balancing process for a service connecting server).

The packet gateway device also functions as a transparent proxy. As a TCP/IP system, the device in the network, for example, a proxy notifies an upper application of only the MAC address of the packet gateway device on the Ethernet layer, and passes other addresses through the network. Furthermore, generally, an upper application is notified of the process of a packet having the destination IP address as an address of the packet gateway device in the MAC addresses of the packet gateway device, but the transparent proxy notifies the upper application of the reception of a packet after rewriting an IP address although the IP address is not addressed to the packet gateway device. In this case, the original IP address is stored in, for example, a table.

When the process is started as shown in FIG. 17, the address conversion unit 72 receives a packet first in step S31, and it is determined in step S32 whether or not the packet is a connecting packet of a new TCP connection, that is, a connection opening packet. If it is an opening (connection) packet, then the information about the destination address and the source address is stored in the address information storage table 85 shown in FIG. 16 in step S33 using a unique source port number as a key.

Then, in step S34, the destination address is set as the address of the packet gateway device, the source port number is set as the unique key number, the packet is transmitted to the gateway control unit 75 through the TCP/IP protocol handler unit 73, the TCP/IP protocol process is performed in step S35, and it is determined in step S36 whether or not the packet is a connection opening (connecting) packet.

If it is an opening packet, the gateway control unit 75 retrieves the destination address information from the address information storage table 85 in step S37 using the source port number of a packet as a key, and the TCP/IP protocol handler unit 73 is requested to perform the normal TCP connection process on the service providing server based on the destination address in step S38 shown in FIG. 18.

In step S39, the TCP/IP protocol process is performed. In step S40, the load balancing unit 74 refers to the balancing policy information table 84. In step S41, it is determined whether or not the destination address is a representative address of a plurality of service providing servers for providing the same services. If it is a representative address, then it is determined in step S42 whether or not it is a connection opening (connecting) packet. If it is an opening packet, then a service providing server is selected in step S43 according to a balancing policy such as a round robin system, etc., and the actual address information is set as the destination address of a packet.

Then, in step S44 shown in FIG. 19, the actual address of the selected server is stored in the distribution information table 90 using the source port number as a key, it is determined in step S45 whether or not a normal disconnection request for a TCP connection which is a disconnection reply (fin act) or an abnormal disconnection request (reset) is being transmitted to the server. In this example, since the packet is a connection opening packet, the address of the packet gateway device is set as the source address in step S46, and the packet is transmitted to the service providing server, thereby terminating the process. Since the address of the packet gateway device is set as the source address, a down packet from the service providing server to the mobile device is transmitted to the packet gateway device which has transmitted an up packet. The processes in steps S45 and 57 are performed for the disconnecting process on the TCP connection because the TCP connection disconnection reply (fin act) and the abnormal disconnection request (reset) can be transmitted to the mobile device as the TCP/IP protocol process on the down packet in step S111 shown in FIG. 21.

If the received packet is not a connection opening (connecting) packet in step S32 shown in FIG. 17, it is determined in step S47 whether or not a received packet is a data packet on the way from the connection to the disconnection. In this case, after the address information about the destination and the source of the packet is retrieved using a unique source port number as a key in step S48, the processes in steps S34 and 35 are performed as on a connecting packet.

If it is determined in step S36 that it is not a connecting packet, and if it is determined in step S49 that it is a data packet on the way, the destination address information is retrieved in step S50 as in the process in step S37 on the connecting packet, a TCP connection is identified according to the destination address information, and the TCP/IP protocol handler unit 73 is requested to perform the data transmitting process in step S51 shown in FIG. 18.

The processes in steps S39 to S41 are performed as in the process performed on the connecting packet, it is determined in step S42 that it is not a connecting packet, it is determined in step S52 that it is a data packet on the way, the actual address of the server at which the data packet is to be transmitted from the distribution information table 90 is retrieved using the unique source port number as a key in step S53 shown in FIG. 19, it is determined in step S45 that it is not the case of transmitting a packet of a disconnection reply or an abnormal disconnection request, and the packet is transmitted in step S46, thereby terminating the process.

If it is determined in step S47 shown in FIG. 17 that the received packet is not a data packet on the way, the received packet refers to an abnormal disconnection request (reset) for a TCP connection or a disconnection reply (fin act) corresponding to a normal disconnection request, the address information about the destination and the source of the packet is retrieved in step S54 as in step S48, and the processes in step S34 to 36 are performed, it is determined that the packet is not a data packet on the way in step S49, but it is determined that a disconnection of a TCP connection is performed, the destination address information is retrieved from the address information storage table 85 in step S55, the TCP/IP protocol handler unit 73 is requested to perform the TCP disconnection process on the mobile device side in step S56 shown in FIG. 18, the TCP connection on the server side is identified based on the retrieved destination address in step S55, and the TCP/IP protocol handler unit 73 is requested to perform the disconnecting process.

Then, if after the processes in steps S39 to S42, it is determined in step S52 that it is not a data packet, and if it is determined in step S45 shown in FIG. 19 that a packet of a disconnection reply or an abnormal disconnection request is to be transmitted to a server, and after the deletion of the corresponding record in the address information storage table 85 by the address conversion unit 72 in step S57, then a packet of a disconnection reply or an abnormal disconnection request is transmitted to a service providing server in step S46, thereby terminating the process.

Since the user authentication device 24 assigns an IP address to the mobile device as described above, and a session before a user log-out is performed can normally include a plurality of TCP connections, a TCP connection opening (connecting) packet is not always the first packet in the session, or a TCP normal disconnection (reply) packet or a TCP reset (abnormal disconnection request) packet is not always the last packet in the session.

When the destination address is not a representative address in step S41 shown in FIG. 18, control is directly passed to step S45 shown in FIG. 19. If the packet is a connecting packet or a data packet on the way, then the packet is transmitted to the destination service providing server in step S46, thereby terminating the process. If the packet refers to a disconnection reply or an abnormal disconnection request, then the processes in steps S57 and 46 are performed, thereby terminating the process.

In the case in which the destination address is not a representative address in step S41, a packet is transmitted with the actual address of a service providing server specified in advance instead of transmitting a packet with the representative address of a plurality of service providing servers for providing the same services transmitted from the mobile device. In this case, no representative address can be detected in the balancing policy information table 84, and the packet gateway device does not perform load balancing.

FIGS. 20 and 21 show flowcharts of the distributing process by the packet gateway device of the down packet, that is, a packet transmitted from the service providing server to the mobile device. When the process is started as shown in FIGS. 20 and 21, the packet transmitted from the service providing server in step S101 is received by the address conversion unit 72, the balancing policy information table 84 is referred to in step S102, it is determined in step S103 whether or not the corresponding record including the actual address of the service providing server as the source of the packet has been found. If it has been found, then the source address is converted in step S104 from the actual address of the service providing server to a representative address for a plurality of servers for providing the same services, and it is determined in step S105 whether or not the packet is an abnormal disconnection request (reset) packet of the TCP connection.

When normal communications are performed in a TCP connection, it is determined that the packet is not a reset packet, the packet is transmitted to the gateway control unit 75 through the TCP/IP protocol handler unit 73 in step S106, and the TCP/IP protocol process is performed in step S107.

In step S108 shown in FIG. 21, the gateway control unit 75 reads the stored address of the mobile device, that is, the source IP address from the address information storage table 85 using the TCP port number as the destination address information about a packet as a key, and it is determined in step S109 whether or not the packet is a data packet of the TCP connection that is on the way.

When it is a data packet on the way, the gateway control unit 75 specifies a socket in step S110 based on the read source (to be a destination) IP address and the port number used as a key, and a data transmission is performed, that is, a send function is issued, through the TCP/IP protocol handler unit 73.

The TCP/IP protocol process is performed in step S111. In step S112, the address conversion unit 72 sets in a packet from the address information storage table 85, using the destination port number as a key, the stored representative address of the service providing server, that is, the stored destination IP address, and the port number, the port number of the mobile device, that is, the stored port number. In step S113, it is determined whether or not a disconnection reply or an abnormal disconnection request is transmitted. If not, the address conversion unit 72 transmits the packet to the mobile device in step S114, thereby terminating the process. The processes in steps S113 and S117 are performed so that the TCP/IP protocol handler unit can transmit the TCP connection disconnection reply (fin act) and abnormal disconnection request (reset) to the mobile device as the TCP/IP protocol process for disconnection of a TCP connection in step S35 as shown in FIG. 17.

If there are no source address of the received packet, that is, the record indicating the representative address corresponding to the actual address of the service providing server, in the balancing policy information table 84 in step S103, that is, if no representative address has been specified as the destination address of an up packet from the mobile device, then the packet is transmitted to the mobile device without performing the process in step S104. In step S112, the representative address of the service providing server is not set, and the packet is transmitted in step S114.

If the received packet is an abnormal disconnection request of the TCP connection, that is, a reset packet, from the server in step S105 shown in FIG. 20, then the address conversion unit 72 deletes the corresponding record in the distribution information table 90 in step S115, and the processes in steps S106 to S108 are performed.

It is determined in step S109 that the packet is not a data packet. In step S116, the gateway control unit 75 specifies a socket based on the destination IP address and a port number as a key read in step S108, the TCP connection between the server and the mobile device is disconnected, that is, a close function is issued through the TCP/IP protocol handler unit 73.

After the processes in steps S111 and S112, it is determined in step S113 that a disconnection packet is transmitted. In step S117, the address conversion unit 72 deletes the corresponding record in the address information storage table 85. Then, in step S114, the packet is transmitted, thereby terminating the process.

The TCP/IP protocol handler unit 73 of the packet gateway device stores the source MAC address of the packet, that is, the MAC address of the load balancer as a packet source, in the cache table not shown in the attached drawings corresponding to the IP address of the received packet when an up packet is received. When a down packet is received, the table is searched to set the destination MAC address of the load balancer which has transmitted an up packet as a destination MAC address, and the down packet is transmitted to the load balancer.

Figure 24:
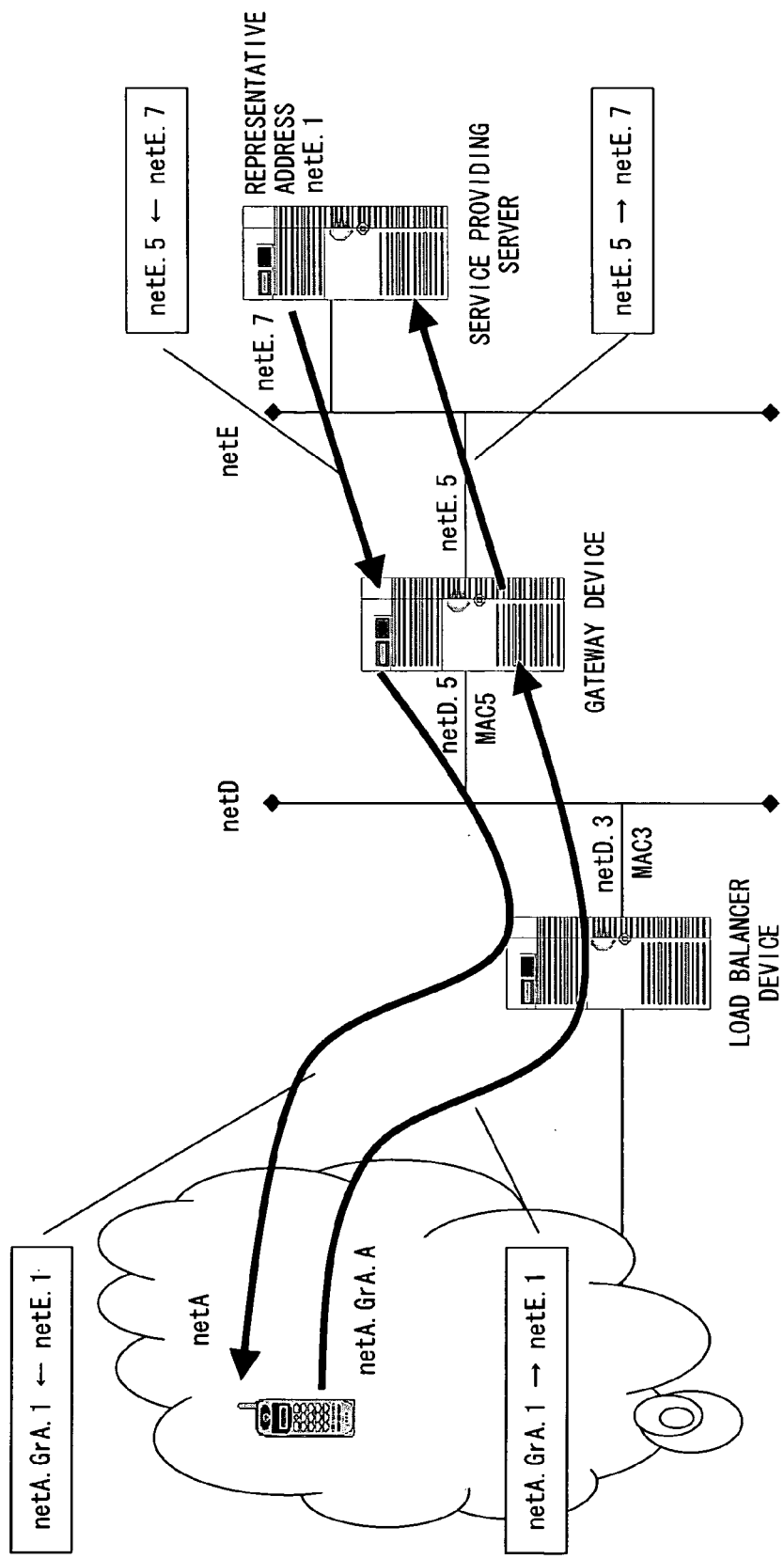
FIG. 24 shows the address conversion by the packet gateway device.

The above-mentioned address conversion in the packet gateway device is further explained below by referring to FIG. 24. In FIG. 24, the source address as the address information about a TCP/IP packet is input in the format of "source network unit. host unit", and the destination address is input in the format of "destination network unit. host unit".

In response to the up packet Net A. GrA. 1→Net E. 1 transmitted from the mobile device to the representative address Net E. 1 of the service providing server, the packet gateway device converts the source address into the actual address Net E. 5 of the packet gateway device, and the destination address into the actual address Net E. 7 of the service providing server Net E. 5→Net. E. 7, and then transmits the conversion result.

The service providing server which has received the up packet transmits a down packet as Net E. 7→Net E. 5 to the gateway device, and the packet gateway device inversely converts the stored address of the mobile device into a destination address, and the source address into the representative address of the service providing server, and transmits the down packet to the mobile device.

Described below is the service authentication by the packet gateway device. It is determined whether or not a service requested by a mobile device, that is, a service provided by a corresponding service providing server, is available by a user of the mobile device.

As described above, in the conventional mobile device packet network described by referring to FIG. 33, a TCP connection is managed by a service providing server itself. Therefore, for example, a TCP connection is to be reconnected each time an available service from the viewpoint of the mobile device is switched. As a result, time delay due to the switching of services including service authentication has been a problem.

Figure 25:
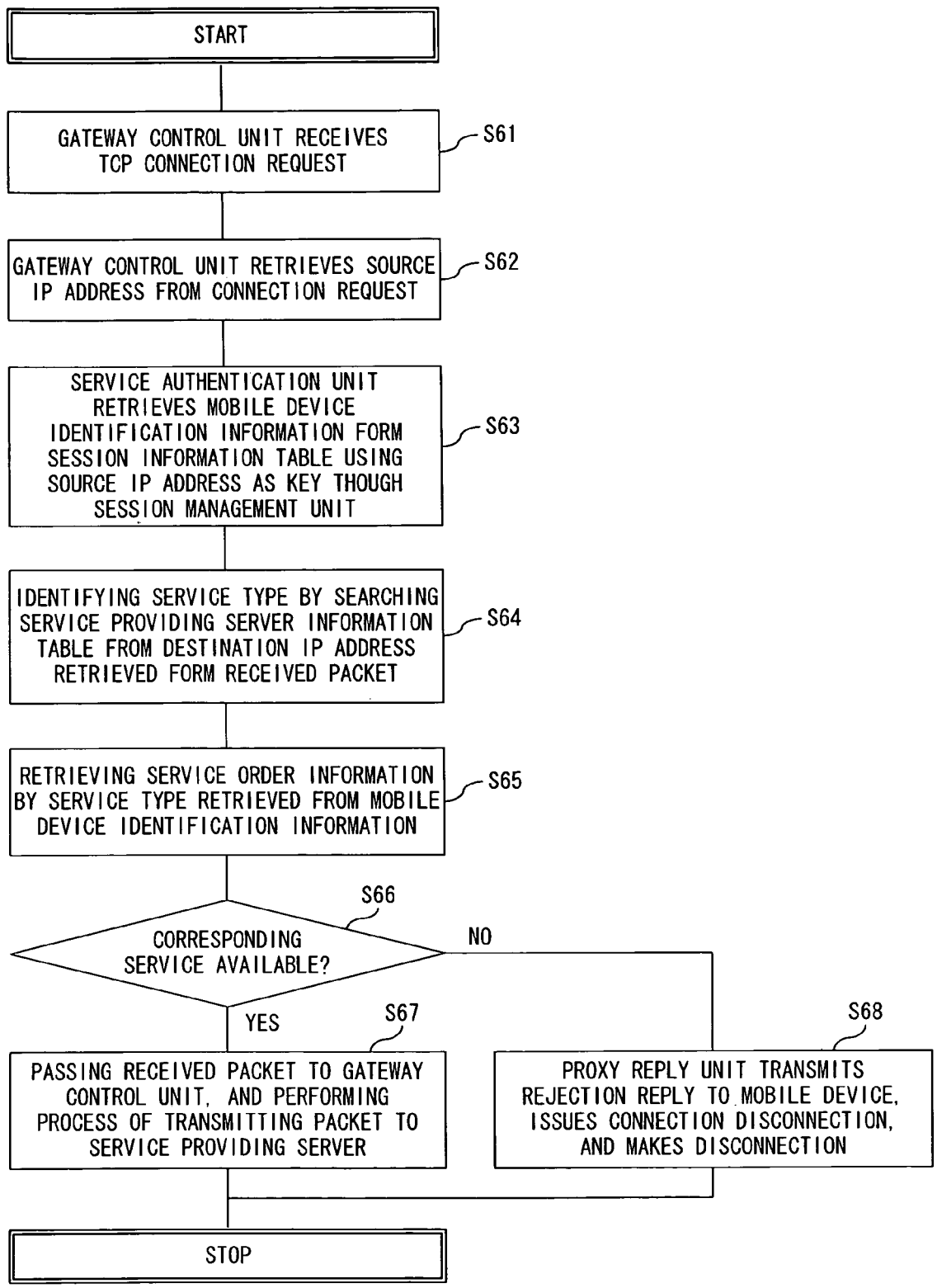
FIG. 25 is a flowchart of the service authenticating process by the packet gateway device.

FIG. 25 is a flowchart of the service authenticating process by the packet gateway device. This process is basically performed by the service authentication unit 80 shown in FIG. 16. FIG. 26 shows an example of the data stored in the service order information table 87. FIG. 27 shows an example of the data stored in the service providing server information table 88.

When the process is started as shown in FIG. 25, the first service request (connection start) packet first transmitted from the mobile device in step S61 is received by the gateway control unit 75, and a source IP address is retrieved from the packet and provided for the service authentication unit 80 in step S62.

The source IP address corresponds to the distributed IP address in the session information table 86 shown in FIG. 10, and the corresponding mobile device identification information is retrieved from the table in step S63.

In step S64, a destination IP address is retrieved from the received packet. The destination IP address is a representative IP address of the group of the service providing servers for providing the same services, and the service type corresponding to the representative IP address is determined by referring to FIG. 27.

The service order information table shown in FIG. 26 stores the information about whether or not various services such as mail, chats, etc. corresponding to mobile device identification information are available (OK). In step S65, the contents of FIG. 26 are retrieved according to the mobile device identification information and the service type determined in step S64. In step S66, it is determined whether or not the corresponding service is available.

If it is available, then the received packet is transmitted to the gateway control unit 75 in step S67, and the process of transmitting the packet to the service providing server is continued afterwards. If the service is not permitted in step S66, then the proxy reply unit 81 transmits a TCP reset packet to the mobile device, thereby disconnecting the connection and terminating the process.

Figure 28:
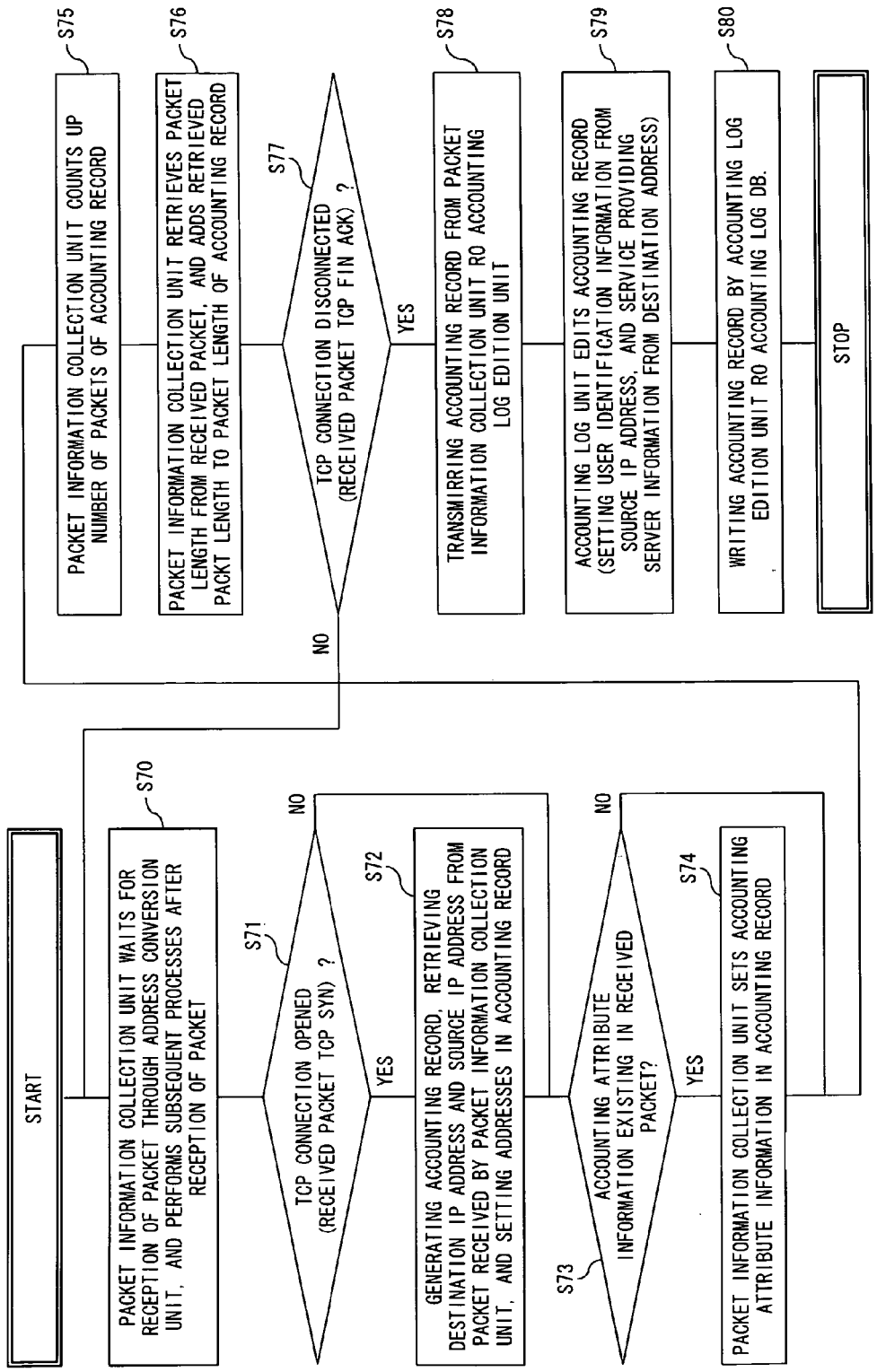
FIG. 28 is a flowchart of the proxy accounting information process by the packet gateway device.

FIG. 28 is a flowchart of the accounting information generating process performed by the packet gateway device. FIG. 28 is explained by referring to an example of the data of the accounting record shown in FIG. 29.

In the conventional system shown in FIG. 33, only the service providing server can perform an authenticating process in a contract service unit, and an accounting record for collection of a fee for pay contents is generated in a service providing server unit. Therefore, they cannot be collectively handled in a proxy accounting process, or a proxy accounting for a service fee cannot be performed by an externally connected server of the system.

According to the present embodiment, the packet information collection unit 78 shown in FIG. 16 collects the number of packets and the total packet length for each combination of address information about a mobile device and address information about a service providing server for generation of an accounting log, and notifies the accounting log edition unit 82 of the result. When there is accounting attribute information to be interpolated for designation of an accounting target, the accounting attribute notification unit 79 manages the information obtained from the data packets of the users, and the result is transmitted to the accounting log edition unit 82.

The accounting log edition unit 82 edits the accounting log according to the information obtained from the packet information collection unit 78 and the accounting attribute notification unit 79, and the result is stored in the accounting log DB. 89. The contents of the accounting log include a source designation which can be determined from the session information according to the address information about the mobile device, a destination as an IP address of the service providing server according to the notification from the packet information collection unit 78, and the accounting attribute information obtained from the accounting attribute notification unit 79.

When the process is started as shown in FIG. 28, a received packet is received by the packet information collection unit 78 through the address conversion unit 72 in step S70. In step S71, it is determined whether or not the packet is a TCP connection opening packet, that is, a TCP syn packet.

If it is an opening packet, a new accounting record is generated in step S72, a destination IP address is retrieved from a received packet by the packet information collection unit 78, and is set in the accounting record, and then control is passed to step S73. If it is not an opening packet, control is passed directly to step S73.

In step S73, it is determined whether or not a received packet contains accounting attribute information, for example, the URL, etc. of the connection server when an external connection is made as shown in FIG. 29. If yes, the accounting attribute information is set in the accounting record in step S74, and control is passed to step S75. If not, control is passed directly to step S75.

In step S75, the number of packets of the accounting records is incremented by 1. In step S76, the packet length retrieved from the received packet is added to the total packet length of the accounting records. In step S77, it is determined whether or not the TCP connection is to be disconnected, that is, the received packet is a TCP fin ack packet. If not, the processes in and after step S70 are repeated.

If the TCP connection is to be disconnected, the packet information collection unit 78 transmits an accounting record to the accounting log edition unit 82 in step S78. In step S79, the accounting log edition unit 82 edits the accounting record, that is, the mobile device identification information is set from the source IP address, and the service type and the representative IP address of the service providing server are set from the destination address. In step S80, the result is written as an accounting log to the accounting log DB 89, thereby terminating the process. FIG. 29 shows the storage result in the accounting log DB 89, and the collected contents in the packet information collection unit 78, for example, the destination IP addresses, are converted into mobile device identification information and stored as an accounting log.

Figure 30:
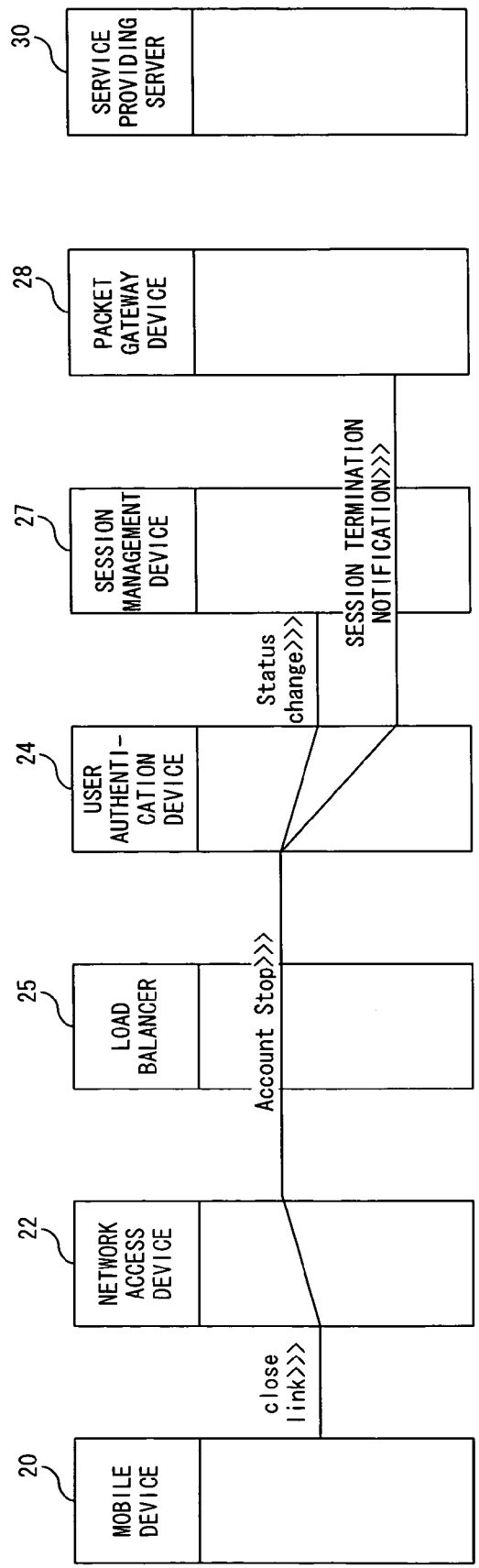
FIG. 30 shows a sequence of the processes performed between the apparatuses by the user log out when a session terminates.

FIG. 30 shows the inter-device process sequence when a session terminates. FIG. 30 corresponds to the inter-device process sequence when a session starts as shown in FIG. 3, and shows the sequence when a user log-out occurs to terminate the communications by the mobile device 20.

When the user log-out occurs as shown in FIG. 30, the network access device 22 transmits an account stop to the user authentication device 24, the user authentication device 24 receives it and transmits a status change (close) to the session management device 27, and transmits a session termination notification packet to the packet gateway device 28. The packet format of these packets is shown in FIG. 6.

The session management unit 54 of the session management device deletes a corresponding record in the session information table 55, and the session management unit 83 also deletes a corresponding record in the session information table 86.

Figure 31:
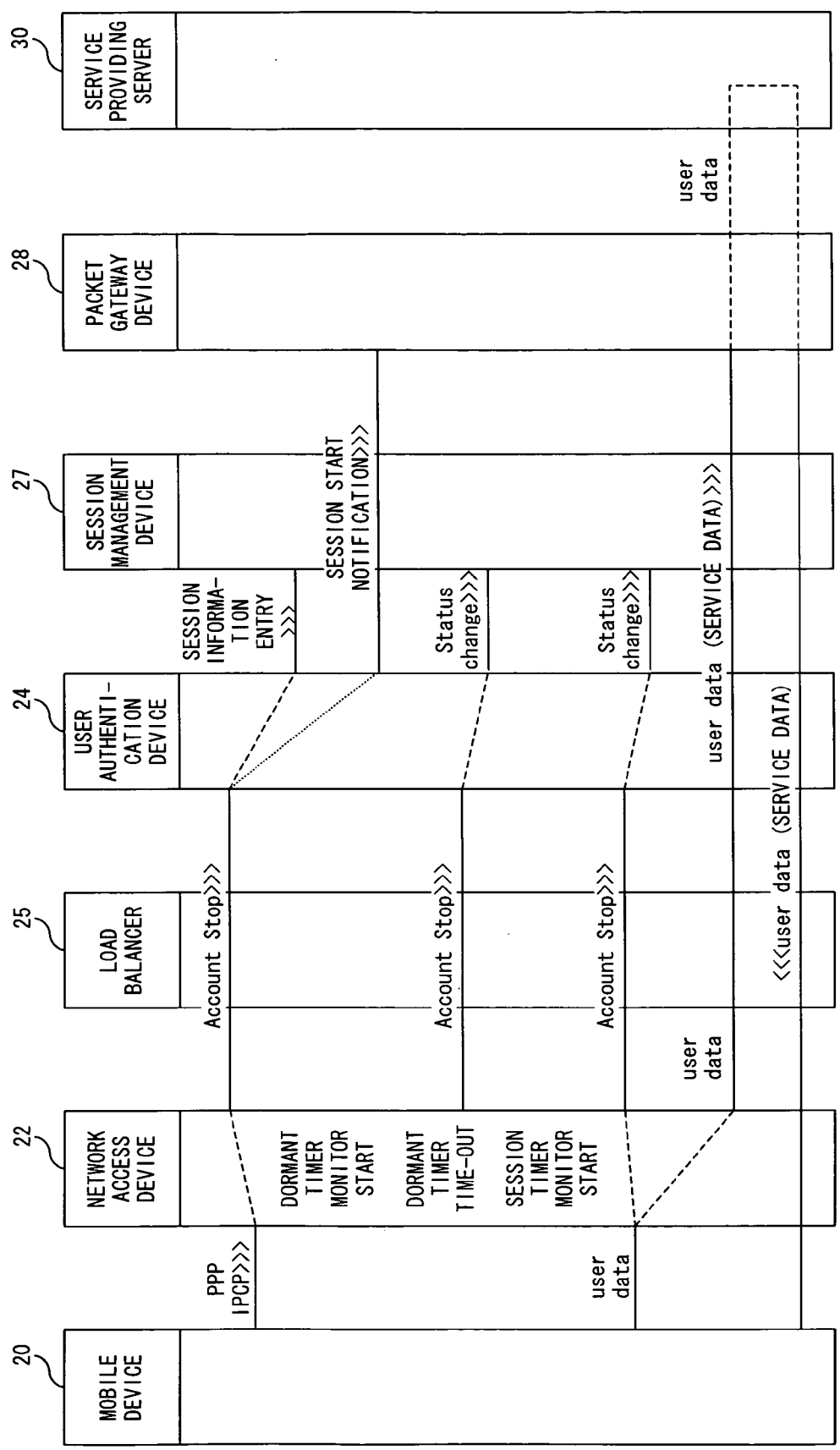
FIG. 31 shows a sequence of the processes performed in a dormant state.

FIG. 31 shows the sequence of the processes performed in a dormant state, that is, when a TCP connection continues but no communications are performed with a mobile device for a predetermined period. Normally, the network access device 22 transmits an account start to the user authentication device 24 when a TCP connection starts, and simultaneously starts the monitor by the dormant timer. A session information entry from the user authentication device 24 to the session management device 27 and a session start notification to the packet gateway device 28 are similarly transmitted as shown in FIG. 3.

However, if a timeout of the dormant timer occurs before a data, packet from the user is transmitted from the mobile device 20 to the network access device 22, then the network access device 22 transmits an account stop to the user authentication device 24.

Upon receipt of the account stop, the user authentication device 24 transmits a status change (stop) to the session management device 27, and the session management unit 54 of the session management device changes the session state of the corresponding record in the session information table 55 into "dormant". The session management unit 83 of the packet gateway device 28 also changes the session state of the corresponding record in the session information table 86 into "dormant".

The network access device 22 starts monitoring the session timer after the timeout of the dormant timer occurs. If the timeout of the session timer occurs although not shown in FIG. 31, then an account stop is transmitted to the user authentication device 24.

Upon receipt of the account stop, the user authentication device 24 transmits a status change (close) to the session management device 27, and transmits a session termination notification to the packet gateway device 28.

The session management unit 54 and the session management unit 83 of the packet gateway device change the session state of a corresponding record in the session information table into close.

On the other hand, when a user data packet is received again from the mobile device 20 as shown in FIG. 31 before a timeout of the session timer occurs, the network access device 22 transmits the account start again to the user authentication device 24, and transmits the data packet to the path of the load balancer.

When the user authentication device 24 receives the account start, it transmits a status change (start) to the session management device 27.

The session management unit 54 and the session management unit 83 of the packet gateway device change the session state of a corresponding record in the session information table into "act". The transmission/reception of the data packet after the load balancer 25 is performed as in the session starting process as shown in FIG. 3.

Described below is the process performed when the packet gateway device for performing the most important function according to the present embodiment is down. The server monitor unit 45 of the user authentication device makes a health check for collecting operating states of the packet gateway device 28 at predetermined intervals as described above. When the packet gateway device is down, the load balancer 25 and the session management device 27 is notified of the information.

The existing session between the packet gateway device 28 and the service providing server 30 is disconnected, and the down packet of the existing session is discarded by the packet gateway device 28 or the service providing server 30.

The user management unit 44 of the user authentication device 24 assigns the address information, outside of the range assigned to the down packet gateway device, to a new session based on the address information table such that the new session cannot be distributed to the down packet gateway device.

When the packet gateway devices 28 are down in multiple, a packet is distributed to a packet gateway device as a proxy device for distribution.

When the packet gateway device 28 is restored, the server monitor unit 45 of the user authentication device notifies the load balancer 25 and the session management device 27 of the information. The user management unit 44 of the user authentication device 24 resumes assigning the address information to the restored packet gateway device 28, and the load balancer 25 resumes distributing a packet to the restored packet gateway device 28.

The first embodiment of the present invention relating to the communications system between a mobile communications terminal and a service providing server managed in a session format configured by one or more TCP connections has been described above in detail. Described below is the second embodiment of the present invention.

In the second embodiment, the present invention is applied to the communications using a UDP (user datagram protocol) in addition to the TCP so that communications using a TCP connection and a UDP packet can be integrally performed.

The session managed by the session management device described above by referring to FIG. 9 shows the communications state between a mobile device and a network access device under the PPP (point-to-point protocol) as a lower layer of TCP/IP. A user session relates to the communications state between a mobile device and a service providing server under an application protocol such as an HTTP, etc. which is an upper layer of TCP/IP. As described later, the user session is managed by the packet gateway device.

The process sequence between devices described above by referring to FIG. 3 and the address assigning process by the user authentication device explained above by referring to FIG. 5 are applicable as is also according to the second embodiment, and FIG. 5 is a flowchart of the process performed in assigning an address under the PPP protocol.

As described later, according to the second embodiment, the user session is managed by the packet gateway device. Therefore, the operation of the packet gateway device is different from that of the first embodiment, and is explained below.

The management of the user session by the packet gateway device, that is, the management of the start and termination of a user session, is performed using the address information storage table. Therefore, the contents of the address information storage table are different from those according to the second embodiment shown in FIG. 22. FIG. 32 shows an example of the contents stored in the address information storage table according to the second embodiment.

In FIG. 32, a user session identifier is an identifier uniquely assigned to a user session, and a protocol identification indicates the identification of a transport layer, that is, a protocol type such as PCT, UDP, etc.

The contents of the storage address information are basically the same as those shown in FIG. 22, the source IP address and the source port number refer to the IP address and the port number of a mobile device, the destination IP address and the destination port number refer to the representative IP address and the port number of the service providing server, and the actual server IP address refers to the IP address of the actual server in one group assigned as a result of load balancing although not shown in FIG. 22.

Described below is the type of a user session. Any of the four units, that is, the log-in unit, the service unit, the packet unit, and the connection unit is used as a type of user session managed by the packet gateway device. Depending on the type, the management of the user session by the packet gateway device is performed. That is, the destination service providing server to which a packet is transmitted is determined to perform load balancing when a user session is started, and the determination is released when the user session terminates.

In the first type of user session, namely, the log-in unit type, the period from the notification of the start of the session by the user authentication device to the notification of the termination of the session refers to a user session. During the period, a packet transmitted from the mobile device to the packet gateway device is distributed to the same server in a service unit.

In the log-in unit, when the mobile device uses different services without log-out, the record of the distribution information table storing the IP address information about an actual server determined in the round robin system when the user session is started is not deleted, and the record is referred to and the packet is distributed when the service is used again.

In the second type of user session, namely the service unit type, the period in which the same services are used is regarded as one user session. During the period, a packet transmitted from the mobile device to the packet gateway device is distributed to the same service providing server. In this type, when different services are used without the log-out on the mobile device side, the record of the distribution information table storing the IP address of the actual server determined in the round robin system, etc. is deleted. If the user of the mobile device uses the service again, the distribution target's actual server is determined in the round robin system, etc., and a packet is distributed.

The packet unit, being the third type of user session, performs a process under the UDP. The period from the transmission of one UDP up packet from a mobile device to a service providing server to the transmission of a down packet from the service providing server to the mobile device is regarded as one user session. That is, the load balancing is performed in a unit of a UDP packet transmitted to the packet gateway device, and the packet gateway device distributes a packet by determining a distribution target service providing server in a round robin system, etc. each time the packet gateway device receives a UDP packet from the mobile device.

The fourth type of user session is a connection unit, and performs a process under the TCP. In the connection unit, the load balancing is performed in a unit of the connection made between the mobile device and the service providing server in the above-mentioned first embodiment, and the system is the same as that in the first embodiment.

FIG. 33 shows the timing of generating a record of the address information storage table and deleting the record corresponding to the type of the user session. As shown in FIG. 33, commonly in the four user session types, a record corresponding to each user session is generated when the user authentication device issues a notification of the start of a session, and is deleted when the user authentication device issues a notification of the end of the session.

On the other hand, the timing of actually storing address information, especially the timing of setting destination address information in a record, depends on the type of user session. First, in the log-in unit, the destination address information is set for a record if it is not already set at the time an up packet from a mobile device to a service providing server is received, or when, even though the destination address information is set for a record, the destination address information stored in a received packet is different from the destination address information about the record in the address information storage table. If they are different from each other, a record having the destination address information stored in the packet is newly added to the record already storing the destination address information.

In the log-in unit, when a user simply uses a service without log-out, the record is added corresponding to the different service, and the record for which the destination address information has already been set is not deleted but remains stored in the address information storage table for use again in the future as with the record in the above-mentioned distribution information table.

In the service unit, as in the log-in unit, the destination address information is set for the record if the destination address information has not been set for the record when the up packet is received. However, if the destination address has been set for the record, and the address information is different from the address information stored in the received packet, then the destination address information is overwritten. By the overwrite, the destination address information set before the overwrite becomes invalid, and the user session in the corresponding service unit is assumed to have been properly terminated.

In the packet unit of the third type, the destination address information is set for the record of the address information storage table when an up packet from a mobile device is received, or the destination address information of the record is cleared when a down packet is transmitted to the mobile device.

In the connection unit of the fourth type, as described above in the first embodiment, the setting point of the destination address information is the time point when a connection establishment request (TC P syn packet) is received from the mobile device, an the destination address information is cleared when the connection disconnection reply (fin act) is transmitted to the mobile device.

Figure 34:
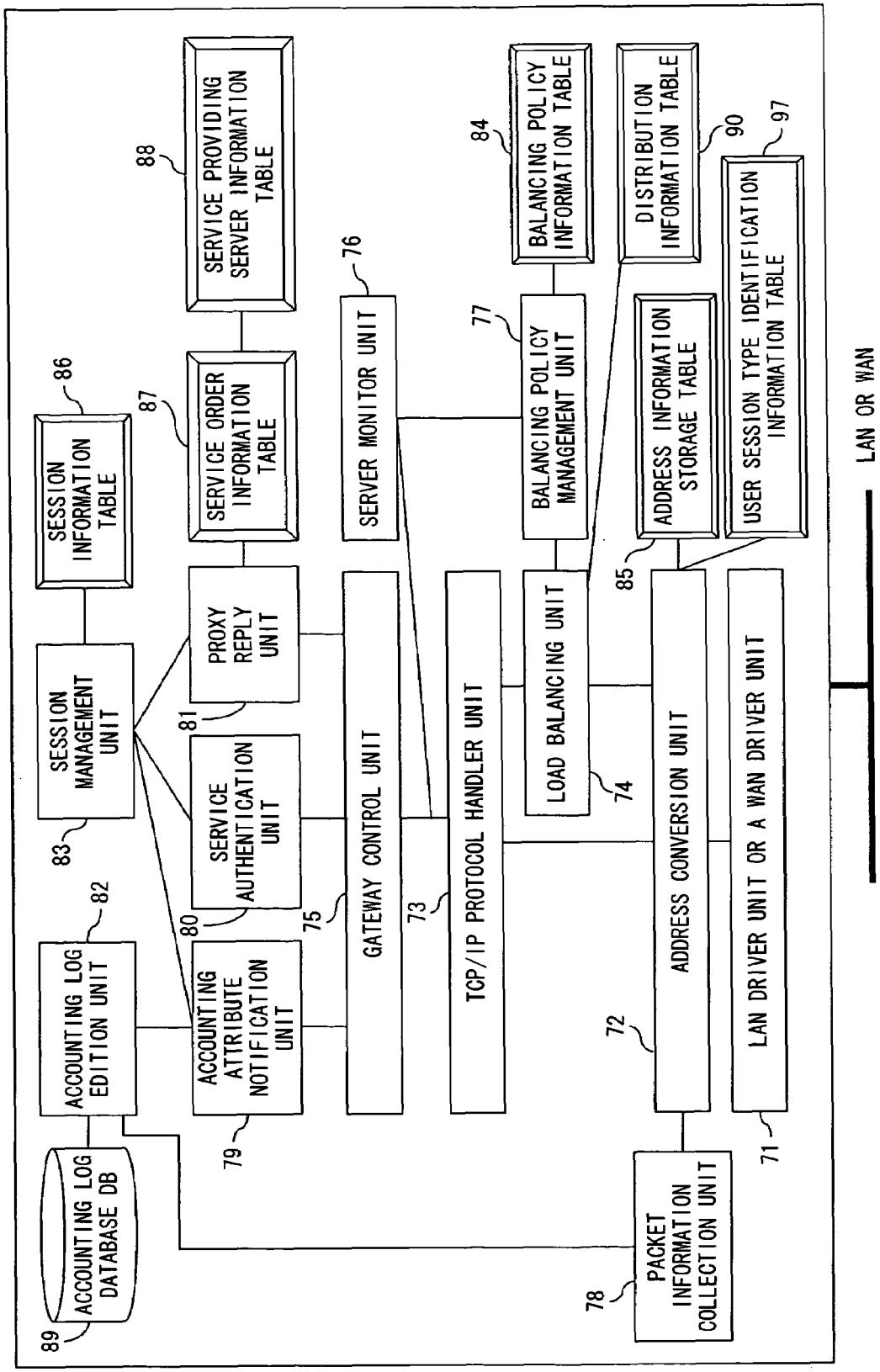
FIG. 34 is a block diagram of the configuration of the packet gateway device according to the second embodiment of the present invention.

FIG. 34 is a block diagram of the packet gateway device according to the second embodiment. In FIG. 34, as compared with FIG. 16 showing the first embodiment, a user session type identification information table 97 newly added in the present embodiment is basically different. Additionally, the contents of the address information storage table 85 are different from those according to the first embodiment.

A user session type is defined by a user normally corresponding to the IP address and the port number of a service representative server, and the protocol type. FIG. 35 shows an example of the contents stored in the user session type identification information table. The contents of the table is defined before the user activates the packet gateway device as described above, and the user session type is identified by the load balancing unit 74 in the gateway control unit referring to the contents.

One user session type can be defined corresponding to the service provided by a service providing server. For example, both the log-in unit and the service unit cannot be set as user session types corresponding to one service.

Described below is the process performed by the packet gateway device. First, the processes of generating and deleting a record in the address information storage table 85 are performed as the processes performed when log-in and log-out are performed on a mobile device.

That is, when a session start packet is received from the user authentication device, the session management unit 83 generates a record having the IP address information about the mobile device, that is, the source IP address, the source port number, etc. set in the address information storage table 85. In this case, a unique key used as a user session identifier is set.

When a session termination packet is received from the user authentication device, the session management unit 83 retrieves the contents of the table using the IP address information about the mobile device as a key, and deletes the record having the source IP address, etc. set.

Figure 36:
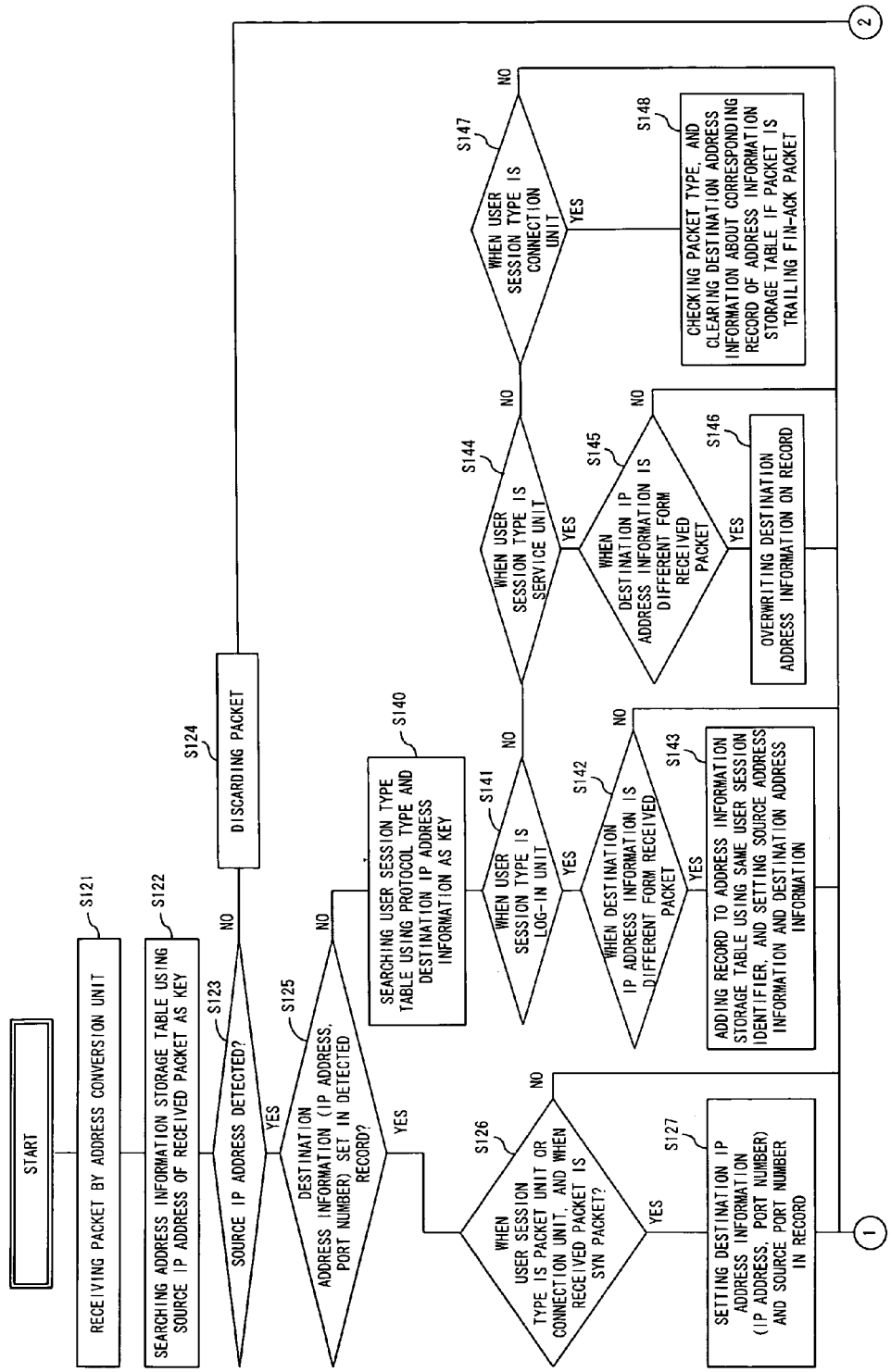
FIG. 36 is a flowchart (1) of the process performed when an up packet is received from a mobile device.
Figure 38:
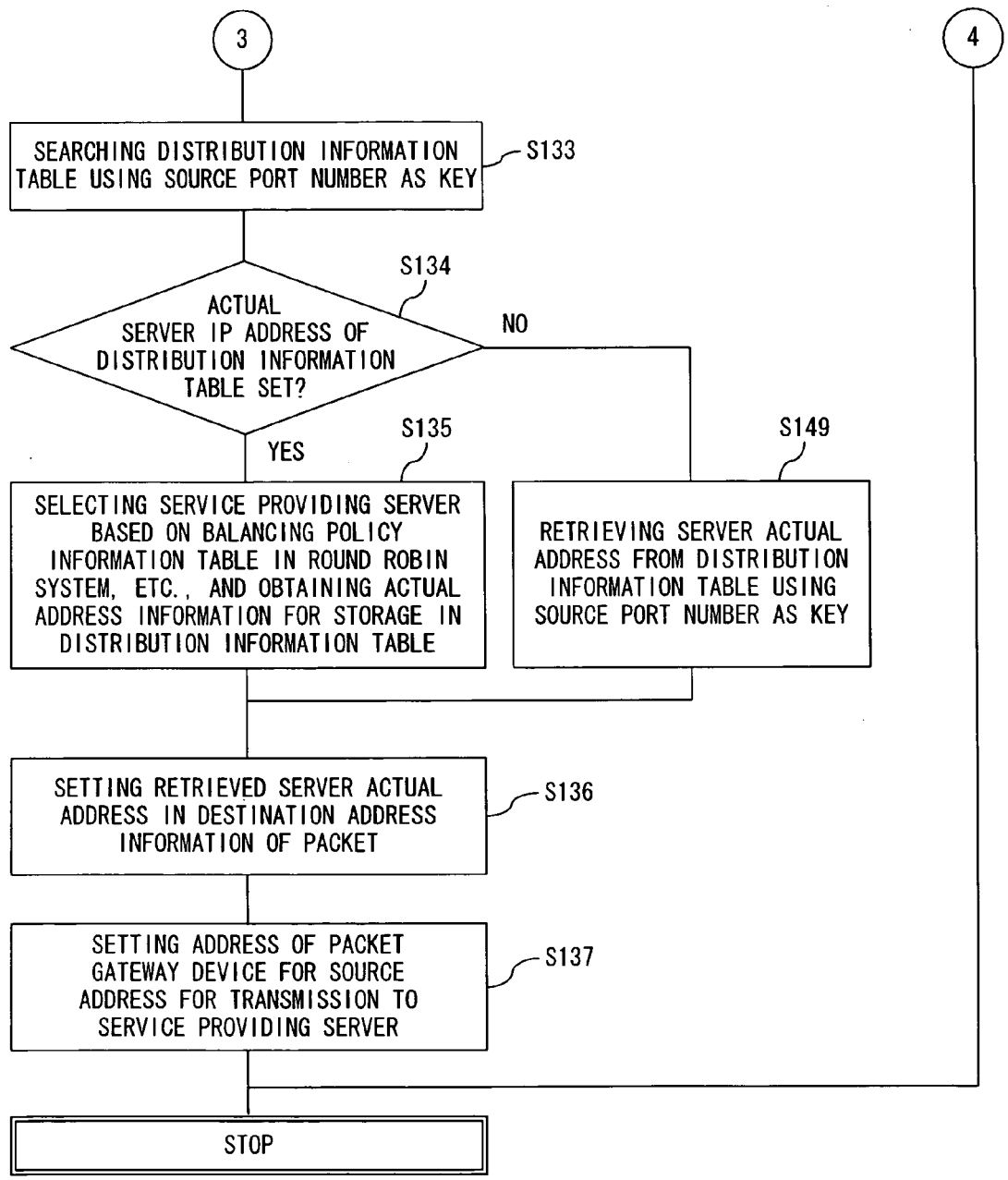
FIG. 38 is a flowchart (3) of the process performed when an up packet is received from a mobile device.
Figure 39:
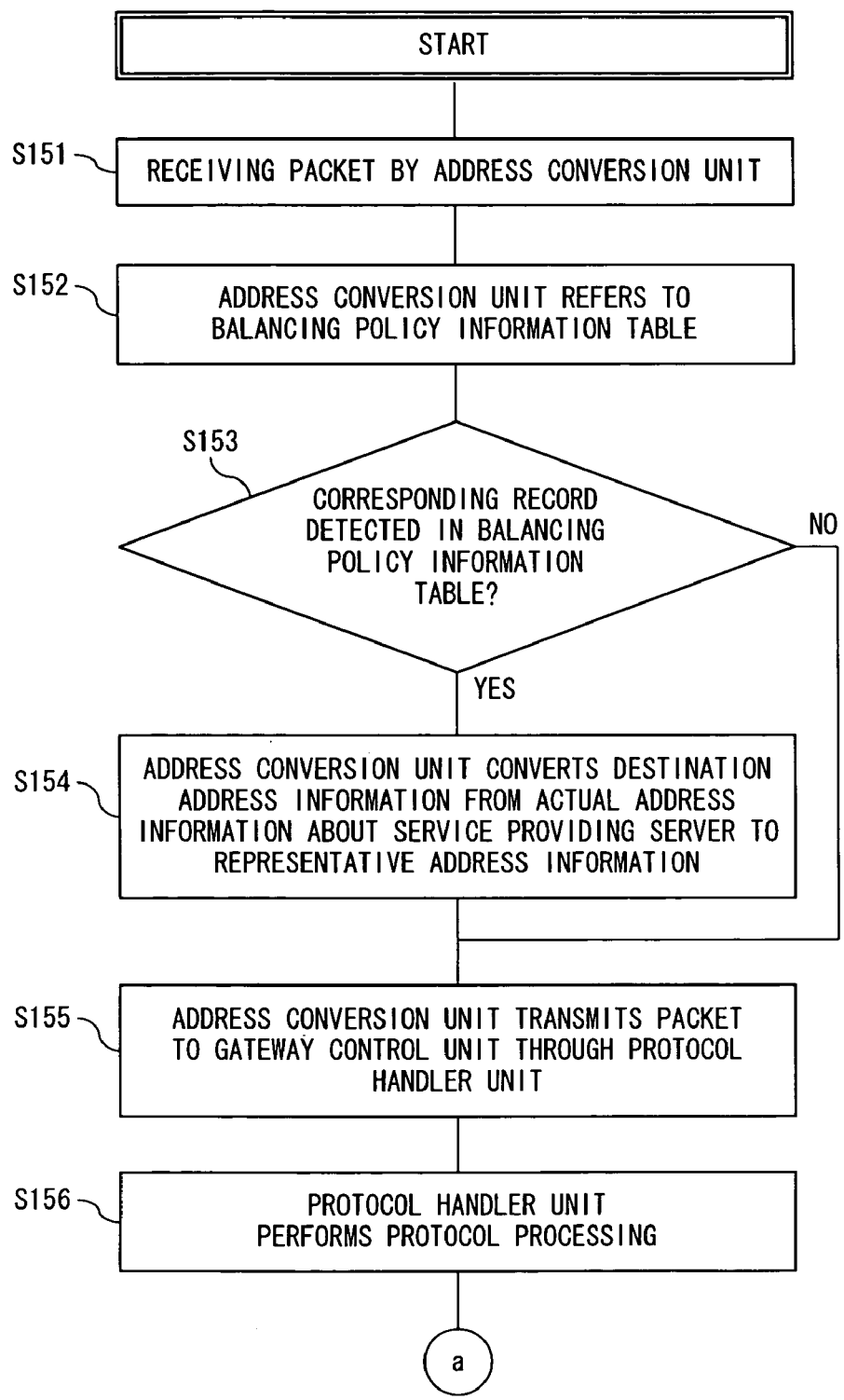
FIG. 39 is a flowchart (1) of the process performed when a down packet is received from a service providing server.
Figure 40:
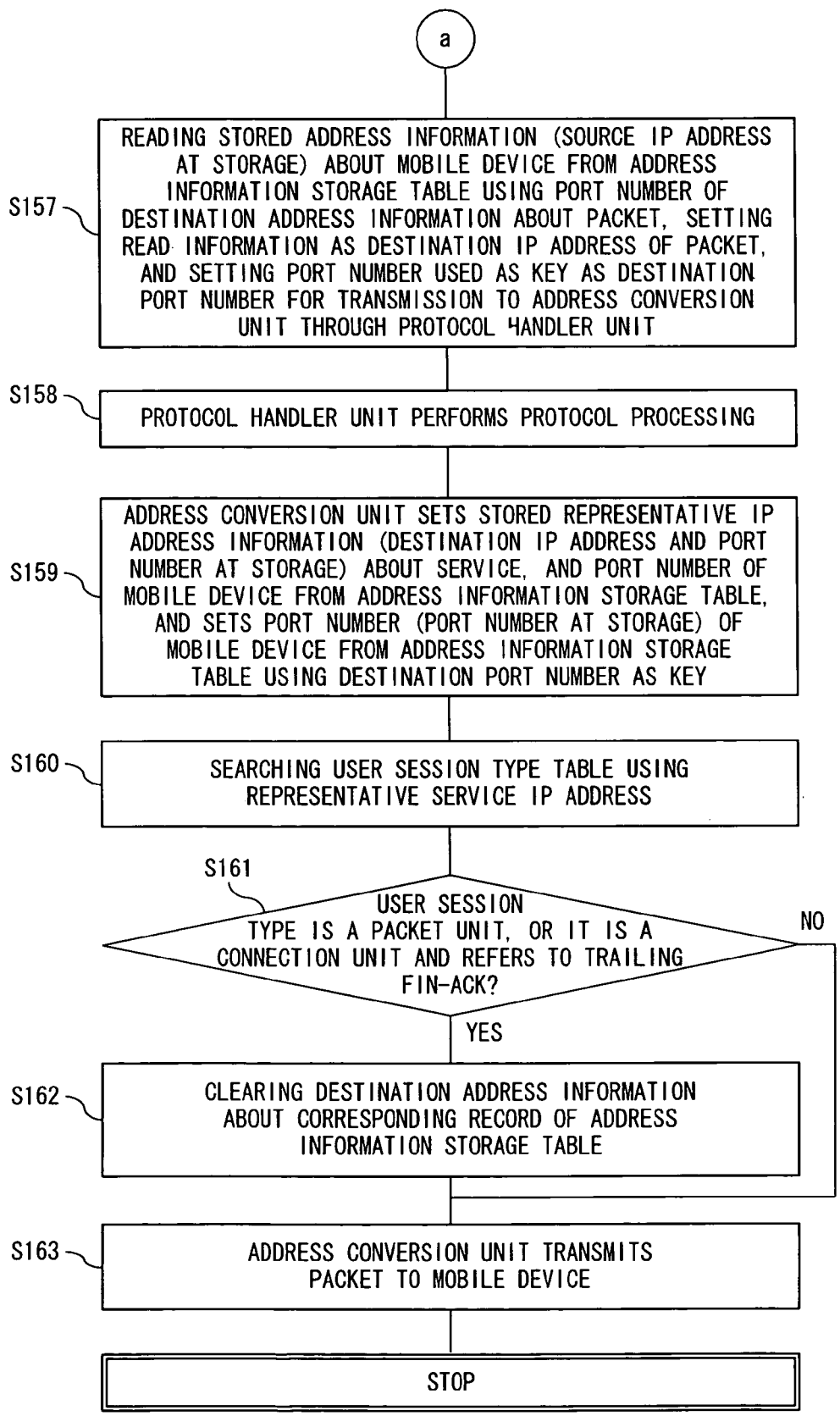
FIG. 40 is a flowchart (2) of the process performed when a down packet is received from a service providing server.

FIGS. 36 through 40 are flowcharts of the processes performed by the packet gateway device when it receives a packet. FIGS. 36 through 38 are flowcharts of the processes when an up packet from the mobile device to the service -providing server is received. FIGS. 39 and 40 are flowcharts of the processes when a down packet from the service providing server to the mobile device is received.

When the process starts as shown in FIG. 36, first in step S121, a packet is received by the address conversion unit 72 as in step S31 shown in FIG. 17, the source IP address in the address information storage table is retrieved using the source IP address stored in the received packet as a key in step S122. It is the determined in step S123 whether or not the address has been detected. It is determined in step S124 that no session start packet from the user authentication device has been received, thereby discarding the packet and terminating the process.

If the source IP address has been detected in step S123, then it is determined in step S125 whether or not the IP address and the port number have been set as the destination IP address information for the record. If not, it is determined in step S126 whether the user session type is a packet unit, or if it is a connection unit and the received packet is a syn packet indicating a connection establishment request. If not, control is passed directly to step S 128. If it is a packet unit, or if it is a connection unit and the received packet is a syn packet indicating a connection establishment request, then the destination IP address information and the source port number are set in the record in step S127, and then control is passed to step S128 shown in FIG. 37. It is necessary to set a destination IP address, etc. in the record each time a packet is received if the user session type is a packet unit, and if the user session type is a connection unit and a connection establishment request.

In step S128 shown in FIG. 37, the address of the server is set as the destination address of the packet, a unique number used for a user session identifier is set as a source port number, the packet is transmitted to the gateway control unit 75 through the TCP/IP protocol handler unit 73, and the TCP/IP protocol handler unit 73 performs a protocol processing in step S129.

In step S130, the gateway control unit 75 retrieves the destination address information stored in the address information storage table 85 by the address conversion unit 72 using the source port number as a key. In step S131, the gateway control unit 75 sets a unique key as a source port number, and the TCP/IP protocol handler unit is requested to perform the packet transmitting process on the service providing server according to the destination address information. In step S132, the TCP/IP protocol handler unit 73 performs a protocol processing.

Then, in step S133 shown in FIG. 38, the distribution information table is searched using the source port number as a key. In step S134, it is determined whether or not the IP address of the actual server has been set in the distribution information table. If not, a service providing server is selected from the balancing policy information table in the round robin system, etc., and the address information about the actual server is obtained and stored in the distribution information table in step S135. In step S136, the address of the actual server is set for the destination address of the packet. In step S137, the address of the packet gateway device is set as the source address, and the packet is transmitted to the service providing server, thereby terminating the process.

If the destination address information is set in a record in step S125, then the user session type table is searched using the protocol type and the destination IP address information as a key in step S140, and it is determined in step S141 whether or not the user session type is a log-in unit. If yes, it is determined in step S142 whether or not the destination IP address is different from the information stored in the received packet.

If they are not different, control is passed to the processes in and after step S128. If they are different from each other, then a record is added in the address information storage table using the same user session identifier, the source address information and the destination address information are set in step S143, and then control is passed to the processes in and after step S128. The process in step S143 is performed as a process of adding a record when the user uses different services in the above-mentioned log-in unit.

If it is determined in step S141 that the user session type is not a log-in unit, then it is determined in step S144 whether or not the user session type is a service unit. If it is a service unit, then it is determined in step S145 whether or not the destination address information in the record is different from the information stored in the received packet. If they are not different from each other, then control is passed directly to the processes in and after step S128. If they are different from each other, then the destination address information is overwritten in step S146, and the processes in and after step S128 are performed. In the service unit, it is determined when the user is receiving different services that the user session type corresponding to the previous service providing server has been terminated.

If it is determined in step S144 that the user session type is not a service unit, it is determined in step S147 whether or not the user session type is a connection unit. If it is, the type of packet is checked in step S148. If it is the trailing fin act packet in the connection, then the processes in and after step S128 are performed after the destination address information of the record of the address information storage table is cleared.

If the IP address of the actual server is set in the distribution information table in step S134, then the IP address of the actual server is retrieved using the source port number as a key in step S149, and then the processes in and after step S136 are performed.

When the process is started upon receipt of a down packet as shown in FIG. 39, the processes similar to those in steps S101 through S104 shown in FIG. 20 are performed in steps S151 through S154, the source address information is converted into the representative address information from the address of the actual server, the address conversion unit 72 transmits a packet to the gateway control unit 75 through the TCP/IP protocol handler unit 73 in step S155, and the protocol processing is performed in step S156.

Then, in step S157 shown in FIG. 40, the gateway control unit 75 reads the address information about the mobile device stored in the address information storage table using the destination port number of the packet as a key, the information is set as the destination IP address of the packet, and a packet having the port number used as a key set as a destination port number is transmitted to the address conversion unit 72 through the TCP/IP protocol handler unit 73. In step S158, the protocol processing is performed. In step S159, the address conversion unit 72 retrieves the representative IP address of the service providing server and the port number of the mobile device from the address information storage table using the destination port number as a unique key, and the process of setting them in the packet is performed.

Then, in step S160, the user session type table is retrieved using the representative IP address of the service providing server in step S160. In step S161, it is determined whether the user session type is a packet unit, or if it is a connection unit and the packet is the trailing fin ack packet. In all of these cases, the destination address information in the corresponding record of the address information storage table is cleared in step S162, and then the address conversion unit 72 transmits a packet to a mobile device, thereby terminating the process. If these cases are not applied, the address conversion unit 72 immediately transmits a packet to a mobile device, thereby terminating the process in step S163.

The second embodiment of the present invention is described above in detail. In the second embodiment, a series of communications can be simultaneously performed among a plurality of groups of service providing servers by specifying a log-in type as a user session type for the plurality of groups of service providing servers, and the mobile device can receive services on a multi-window screen.

Figure 41:
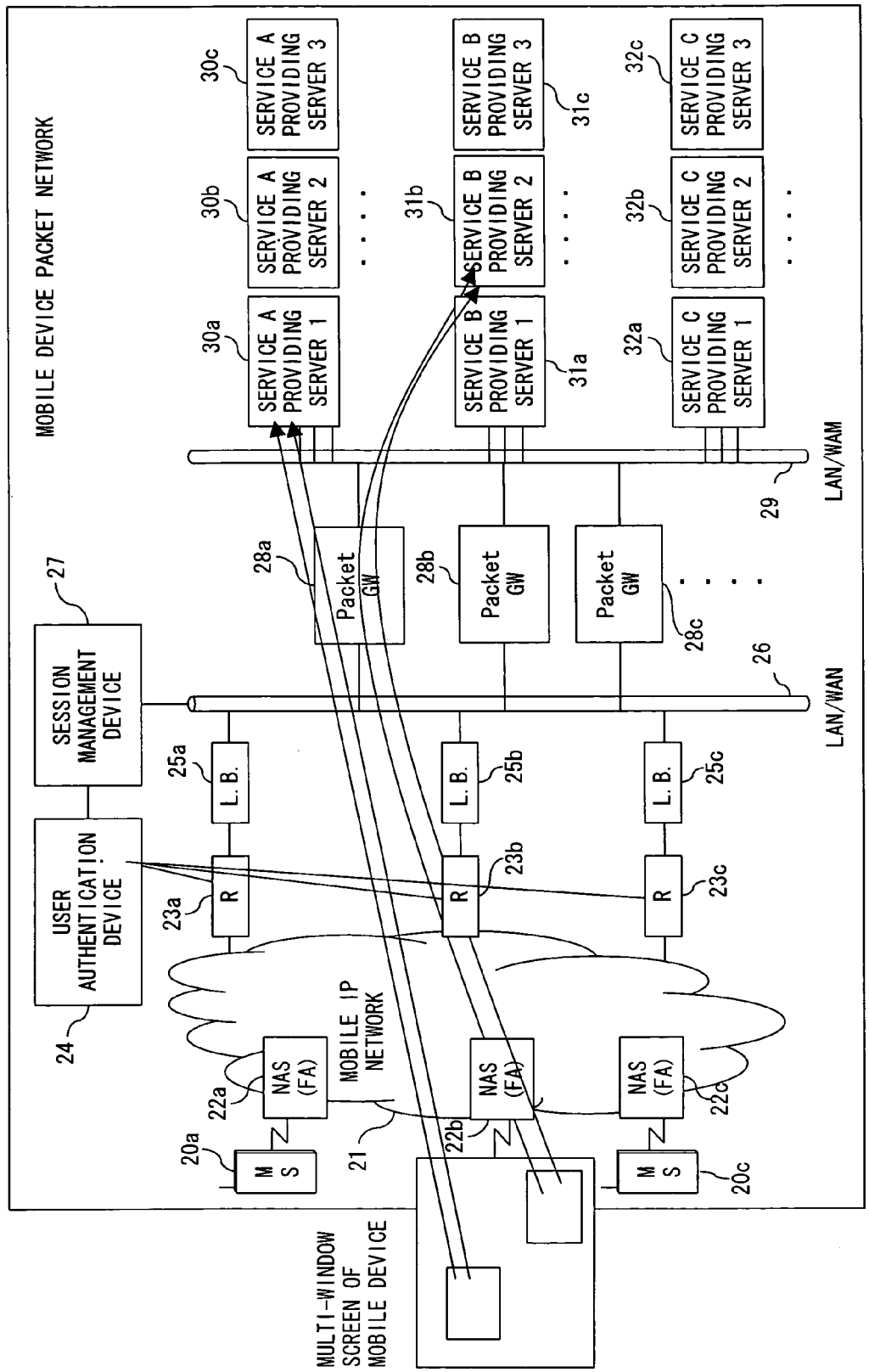
FIG. 41 shows the communications system using a multi-window screen.
Figure 42:
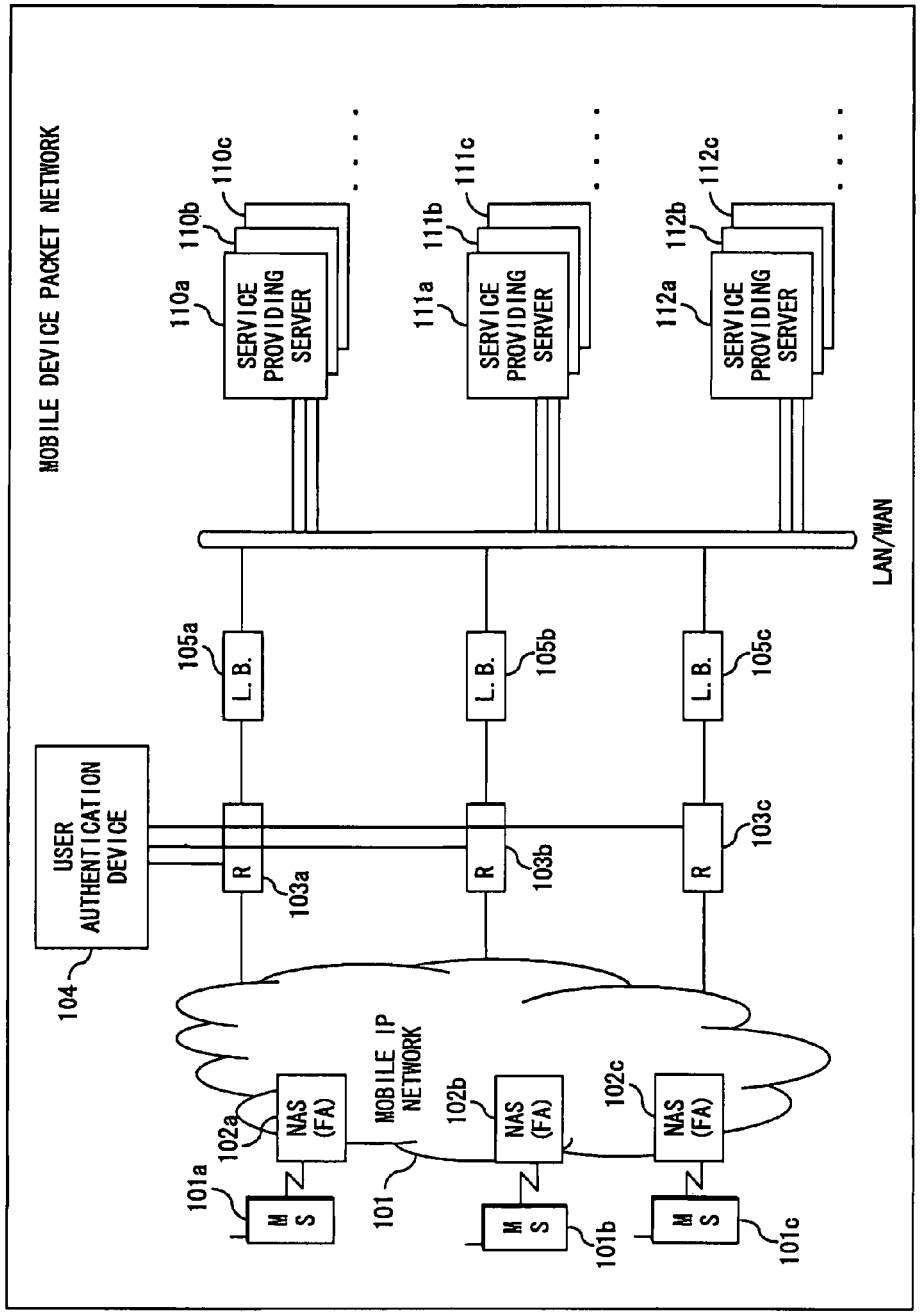
FIG. 42 is a block diagram of the configuration according to the first conventional technology of a mobile device packet network.
Figure 43:
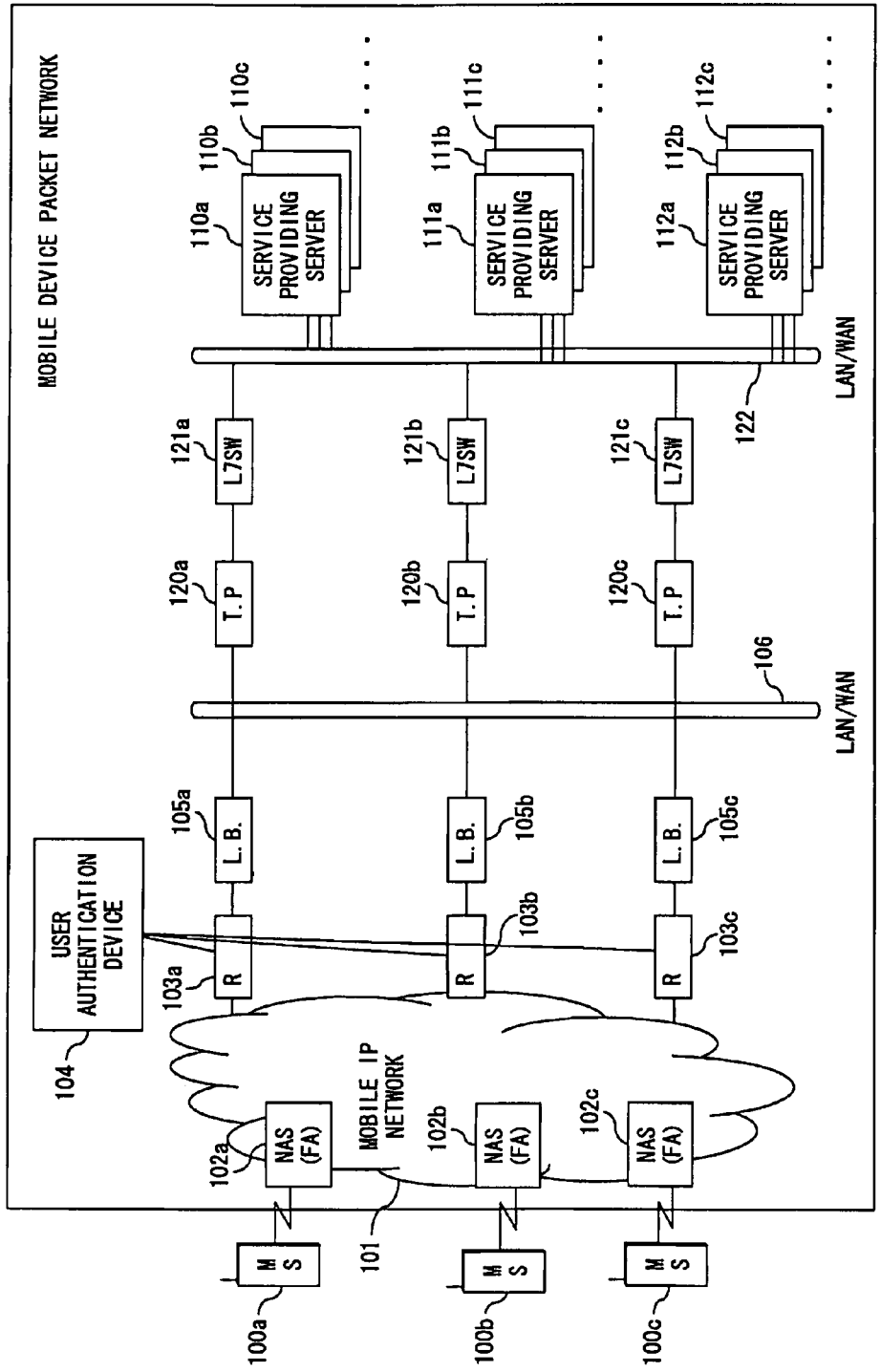
FIG. 43 is a block diagram of the configuration according to the second conventional technology of a mobile device packet network.

FIG. 41 shows the multi-window screen used for the following purpose. On the mobile device side, the group of a service A and the group of a service B can receive the services from the same actual server between the log-in and the log-out by specifying the log-in type as a user session type.

| TCP | log-in type | A - a |
|-----|-------------|-------|
| TCP | log-in type | B - b | where A and B indicate the IP addresses of the servers corresponding to each of the above-mentioned services, and a and b indicate port numbers.

Thus, in the second embodiment, the service providing server for providing a service in each window unit using a multi-window display is fixed, and a service can be obtained from log-in to log-out.

Finally, the process of loading a program to a computer is described below. The packet gateway device 28, the user authentication device 24, and the load balancer 25 having important functions in the present embodiment comprise computers as important components. FIG. 44 is a common block diagram of a computer system.

In FIG. 44, a computer 91 is configured by a body 92 and memory 93. The memory 93 can be storage devices of various forms such as random access memory (RAM), a hard disk, a magnetic disk, etc. The memory 93 stores the programs shown in the flowcharts in FIGS. 5, 13, 17 through 21, 25, 28, and 36 through 40 and the programs according to claims 12 through 19 of the present invention. By the execution by the body 92, the connection in the session can be maintained, the gateway function including the central management of sessions and user sessions, etc. can be realized.

Thus, the program can be loaded from a program provider to the computer 91 through a network 94, or can be stored in a portable storage medium 95 marketed and distributed, and can be loaded to the computer 91. The handy storage medium 95 can be any storage media in various forms such as CD-ROM, a flexible disk, an optical disk, a magneto-optic disk, etc. These storage media can be set in the computer 91 to maintain a session and a user session, and realize a gateway function, etc.

In the above-mentioned explanation, the embodiment of the present invention is explained using a mobile device packet network to which a mobile phone as a mobile device is connected, but the target of the present invention is not limited to a mobile device packet network, and any communications system having a communications terminal connected thereto and using a network having a plurality of input/output points of a plurality of service providing servers can be applied to the communications systems of various types.

As described above in detail, although the network access devices are switched and the load balancer for passing packets are dynamically switched by the movement of a mobile device according to the present invention, the packet gateway device can distribute the packets to the same service providing server, a session and a user session can be controlled, and effective load balancing can be performed. Additionally, the network access device can be extended/changed, etc. without changing the definitions on the mobile device packet network side.

Furthermore, since the same packet gateway device passes not only an up packet to be transmitted to a service providing server and a down packet to be transmitted to a mobile device, but also the subsequent up packet, the following five gateway functions can be realized on the same path.

The first function is the central managing capability of a user session. Although the central management can be performed by the packet gateway device on a session and a user session and services are switched from the viewpoint of the mobile device, sessions or user sessions are not to be reconnected among service providing servers, thereby requiring no time to switch services.

The second function is the risk balancing capability of a service providing server. Since the packet gateway device can continue a session and a user session by switching into a substitute server for providing the same services, the risk of failing in continuing a service can be avoided.

The third function is the proxy accounting capability. Since the packet gateway device can centrally manage sessions, the authentication can be performed in a contract service unit by referring to the authentication contract information about a user of a service, and the accounting information about the fee for pay contents can be generated by proxy.

The fourth function is the protocol conversion capability of a transport layer between a wireless network and a cable network. Since an Internet standard service is used in the wireless communications, the protocol conversion of the transport layer between the wireless network and the cable network such as a window size, etc. can be realized by the packet gateway device.

The fifth function is the gateway function between an IP version 4 network and an IP version 6 network. When an Internet protocol version 6 is implemented, the gateway function to using the current version 4 network can be realized.

Furthermore, according to the present invention, the service providing server for providing services in a window unit can be fixed by using a multi-window display on the mobile device side, and a plurality of services can be obtained from log-in to log-out, thereby largely improving the mobile device communications system.

The present invention is applicable for cable communications systems. Especially, it is effectively used in a communications system which uses a large-scale network having a plurality of input/output points on a service providing server, and is managed by a common carrier for providing communications services.

What is claimed is:

1. A mobile device communications system which has a plurality of service providing servers, and is used for communications by a mobile terminal, comprising:

a first network unit which is connected to the mobile terminal and has a plurality of input/output points to and from the service providing servers;

a plurality of first communications distribution units respectively connected to the plurality of input/output points;

a second network unit connected to said plurality of first communications distribution units;

a third network unit connected to the plurality of service providing servers;

a plurality of second communications distribution units which are connected between said second network unit and said third network unit, for distributing a series of communications between the mobile terminal and any of the plurality of service providing servers to any of the plurality of service providing servers, where said first communications distribution unit distributes said series of communications between said mobile terminal and any of said plurality of service providing servers to any of said plurality of second communications distribution units through said second network unit, wherein each of said plurality of first communications distribution units comprises a same storage contents of distribution destination storage unit storing an address of any of said plurality of second communications distribution units to which a series of communications are to be distributed corresponding to an identifier of a session as the series of communications between the mobile terminal and the service providing servers; and a session management device assigning an identifier to a session as a series of communications between the mobile terminal and the service providing servers to manage the identifier, wherein said second communications distribution unit assigns an identifier to a user session as a series of communications in a layer higher than a layer corresponding to a session managed by said session management device in a hierarchical structure of communications, and distributes communications in the user session between the mobile terminal and the service providing servers to any of the plurality of service providing servers, and the identifier to a user session being a unique number and set as the source port number of the mobile terminal and setting the unique source port number as a source port number of a packet header.

2. The system according to claim 1, wherein:

the plurality of service providing servers form a plurality of groups each being configured by servers providing same services, the mobile terminal specifies a representative address for each of the plurality of groups to communicate with service providing servers, and said second communications distribution unit distributes the series of communications to any of the service providing servers in a group specified by the representative address.

3. The system according to claim 1, wherein when the mobile terminal changes the representative address for a change of a service to be obtained in the series of communications by the mobile terminal, said second communications distribution unit distributes subsequent communications in the series of communications to any of the service providing servers in the group specified by the representative address after the change to continue the series of communications.

4. The system according to claim 1, further comprising a service authentication unit checking whether a user of the mobile terminal has a right to receive a service provided by the service providing servers when said second communications distribution unit distributes the series of communications to any of the plurality of service providing servers.

5. The system according to claim 1, wherein:

said second communications distribution unit can distribute the series of communications not only to the plurality of service providing servers, but also to a server external to said mobile device communications system and said system further comprises an accounting information generation unit generating accounting information about a service received by the mobile terminal from the service providing servers or a server external to said mobile device communications system.

6. The system according to claim 1, wherein there are a plurality of types as types of the user session, and said second communications distribution unit distributes communications in the user session corresponding to the type of the user session.

7. A mobile device communications method for use with a plurality of service providing servers for communications by a mobile terminal, comprising:

the mobile terminal transmitting a packet in a series of communications by specifying any of the plurality of service providing servers;

a load balancer, which received the packet, distributing the packet to any of the plurality of packet gateway devices corresponding to an identifier for the series of communications; and said packet gateway device which was assigned the packet distributing the packet to any of the plurality of service providing servers performing the same services as the service providing server specified by the mobile terminal, wherein:

the series of communications are a session managed by a session management device, and said packet gateway device distributes a packet corresponding to a user session as a series of communications in a layer higher than a layer corresponding to the session in a hierarchical structure of communications, and an identifier to a user session being a unique number and set as a source port number of the mobile terminal and setting the unique source port number as a source port number of a packet header.

8. A computer-readable portable storage medium which is used by a computer configuring a packet gateway device for distributing communications to a service providing server between a plurality of load balancers and service providing servers connected to a network to which a mobile terminal is connected in a mobile device communications system having the plurality of service providing servers for establishment of communications performed by the mobile terminal, and stores a program used to direct the computer to perform operations comprising:

storing a destination address and a source address of a packet received from the load balancer using a unique source port number as a key;

setting the unique source port number as a source port number of a packet header;

selecting any of a plurality of service providing servers capable of providing a service requested by the mobile terminal from among the plurality of service providing servers such that the loads of the service providing servers can be balanced; and transmitting a packet to the service providing server with an address of the selected service providing server set as a destination address, and an address of the device set as a source address, wherein an identifier for a user session as a series of communications in a layer higher than a layer corresponding to a session as a series of communications between the mobile terminal and the service providing server in a hierarchical structure of communications is used as the unique source port number.

9. A mobile device communications system which has a plurality of service providing servers, and is used for communications by a mobile terminal, comprising:

a network unit which is connected to the mobile terminal and has a plurality of input/output points to and from the service providing servers;

a plurality of first communications distribution units respectively connected to the plurality of input/output points;

a plurality of second communications distribution units, connected between said plurality of first communications distribution units and the plurality of service providing servers, for distributing a series of communications between the mobile terminal and the service providing server to any of the plurality of service providing servers, where although the communications between the mobile terminal and the service providing server are performed through any of the plurality of input/output points of the network unit from start to termination of the series of communications, any of said plurality of first communications distribution units distributes the series of communications to a same second communications distribution unit from among said plurality of second communications distribution units, corresponding to an identifier of a session as the series of communications between the mobile terminal and the service providing servers; and a session management device assigning an identifier to a session as a series of communications between the mobile terminal and the service providing servers to manage the identifier, wherein said second communications distribution unit assigns an identifier to a user session as a series of communications in a layer higher than a layer corresponding to a session managed by said session management device in a hierarchical structure of communications, and distributes communications in the user session between the mobile terminal and the service providing servers to any of the plurality of service providing servers, and an identifier to a user session being a unique number and set as a source port number of the mobile terminal and setting the unique source port number as a source port number of a packet header.

\* \* \* \* \*